US012560508B2

(12) United States Patent
Nogami

(10) Patent No.: US 12,560,508 B2
(45) Date of Patent: Feb. 24, 2026

(54) INFORMATION PROCESSING APPARATUS AND INFORMATION PROCESSING METHOD

(71) Applicant: CANON KABUSHIKI KAISHA, Tokyo (JP)

(72) Inventor: Atsushi Nogami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 31 days.

(21) Appl. No.: 18/188,357

(22) Filed: Mar. 22, 2023

(65) Prior Publication Data

US 2023/0228647 A1 Jul. 20, 2023

Related U.S. Application Data

(63) Continuation of application No. PCT/JP2021/035476, filed on Sep. 28, 2021.

(30) Foreign Application Priority Data

Sep. 29, 2020 (JP) ................................ 2020-164108
Sep. 29, 2020 (JP) ................................ 2020-164109

(51) Int. Cl.
*G01M 5/00* (2006.01)
*G01N 21/88* (2006.01)

(52) U.S. Cl.
CPC ........ *G01M 5/0033* (2013.01); *G01M 5/0008* (2013.01); *G01N 21/8851* (2013.01); *G01N 2021/888* (2013.01)

(58) Field of Classification Search
None
See application file for complete search history.

(56) References Cited

U.S. PATENT DOCUMENTS

2011/0224952 A1* 9/2011 Marasco ................. G06F 30/15
703/1
2013/0307703 A1* 11/2013 Foucher .................. G01M 5/00
73/488
2014/0244075 A1* 8/2014 Litwinowicz .......... B64D 45/00
701/99

(Continued)

FOREIGN PATENT DOCUMENTS

CN 108027948 A * 5/2018 ............. G01C 11/02
EP 3633605 A1 5/2018

(Continued)

OTHER PUBLICATIONS

Dong, Guozhu, Xiuzhen Zhang, Limsoon Wong, and Jinyan Li; "CAEP: Classification by aggregating emerging patterns"; In Discovery Science: Second International Conference, DS'99 Tokyo, Japan, Dec. 6-8, 1999 Proceedings 2, Springer Berlin Heidelberg, 1999; pp. 30-42.

(Continued)

*Primary Examiner* — Huy Q Phan
*Assistant Examiner* — Carl F.R. Tchatchouang
(74) *Attorney, Agent, or Firm* — Canon U.S.A., Inc. IP Division

(57) ABSTRACT

Based on a defective state of a structure, a degree of soundness that indicates how much the structure is sound is determined. Information about a defective state of the structure that provides grounds for this determination is outputted.

12 Claims, 15 Drawing Sheets

(56) References Cited

U.S. PATENT DOCUMENTS

| | | | | |
|---|---|---|---|---|
| 2016/0148444 | A1* | 5/2016 | Sauerteig | G07C 5/0808 |
| | | | | 701/29.7 |
| 2017/0276567 | A1 | 9/2017 | Sogawa et al. | |
| 2018/0180511 | A1 | 6/2018 | Takamori et al. | |
| 2018/0217024 | A1 | 8/2018 | Takamori et al. | |
| 2018/0336418 | A1* | 11/2018 | Splittstoesser | G06F 18/22 |
| 2020/0011826 | A1 | 1/2020 | Yungers et al. | |

FOREIGN PATENT DOCUMENTS

| | | | |
|---|---|---|---|
| EP | 3349173 | A1 | 7/2018 |
| EP | 3352129 | A1 | 7/2018 |
| JP | 2011203090 | A | 10/2011 |
| JP | 2016065809 | A | 4/2016 |
| JP | 2017173993 | A | 9/2017 |
| JP | 2018147314 | A | 9/2018 |
| JP | 2018198053 | A | * 12/2018 ......... G06F 18/2431 |
| JP | 2019157535 | A | 9/2019 |
| JP | 2019200120 | A | 11/2019 |
| WO | 2017047315 | A1 | 3/2017 |

OTHER PUBLICATIONS

Dong, Guozhu, and Jinyan Li; "Efficient mining of emerging patterns: Discovering trends and differences"; Proceedings of the fifth ACM SIGKDD international conference on Knowledge discovery and data mining; Aug. 1999; pp. 43-52.

Agrawal, Rakesh, and Ramakrishnan Srikant; "Fast algorithms for mining association rules."; Proc. 20th Int. Conf. Very Large Data Bases, VLDB. vol. 1215, Sep. 1994.

European Patent Office, Extended European Search Report for Application No. 21875556.9, Oct. 2024.

* cited by examiner

| ID | DEFECTIVE-STATE TYPE | POSITION | WIDTH | SIZE | DEGREE OF DAMAGE |
|---|---|---|---|---|---|
| C401 | CRACK | $(x_1, y_1, \cdots x_n, y_n)$ | 0.2 mm | 0.7 m | — |
| C402 | CRACK | $(x_1, y_1, \cdots x_n, y_n)$ | 0.5 mm | 1.0 m | — |
| W411 | WATER LEAK | $(x_1, y_1, \cdots x_n, y_n)$ | — | 1.0 m$^2$ | — |
| . . . | . . . | . . . | | | |
| H422 | CRACK CLOSURE | $(x_1, y_1, \cdots x_n, y_n)$ | — | 0.5 m$^2$ | — |
| L431 | DAMAGE TO LOCK BOLT | $(x_1, y_1, \cdots x_n, y_n)$ | — | — | C |

FIG. 5A

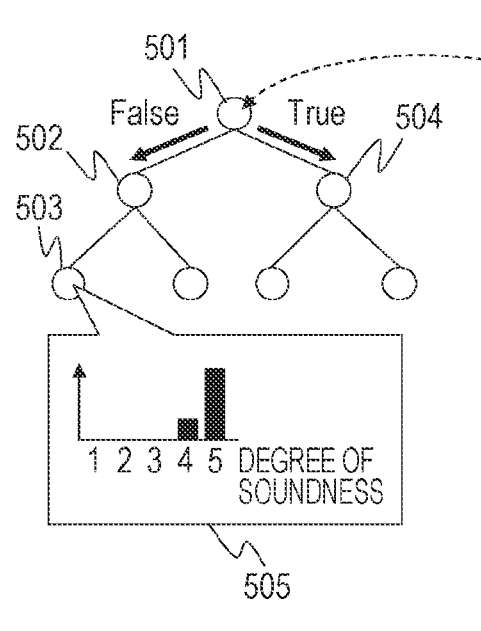

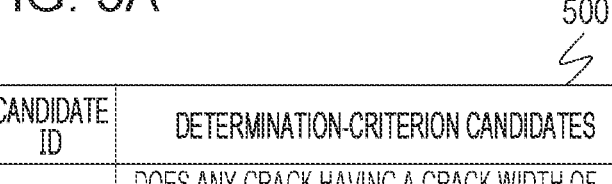

| CANDIDATE ID | DETERMINATION-CRITERION CANDIDATES |
|---|---|
| C1 | DOES ANY CRACK HAVING A CRACK WIDTH OF 0.5 mm OR GREATER EXIST? |
| C2 | DOES ANY CRACK HAVING A CRACK WIDTH OF 1.0 mm OR GREATER EXIST? |
| C3 | IS THE TOTAL LENGTH OF THE CRACK 10 m OR GREATER? |
| C4 | DOES ANY WATER LEAK HAVING AN AREA SIZE OF 1 m² OR GREATER EXIST? |
| C5 | DOES ANY BOLT WHOSE DEGREE OF DAMAGE "A" EXIST? |
| C6 | LOCATED IN A COAST REGION? |
| C7 | DOES ANY CRACK HAVING A CRACK WIDTH OF 0.5 mm OR GREATER + EFFLORESCENCE EXIST? |
| C8 | DOES ANY CRACK HAVING A CRACK WIDTH OF 0.5 mm OR GREATER + A CRACK CLOSURE EXIST? |
| ⋮ | ⋮ |
| Cn | LAPSE OF THIRTY YEARS OR LONGER? + DOES ANY CRACK HAVING A CRACK WIDTH OF 0.5 mm OR GREATER EXIST? |

FIG. 5B

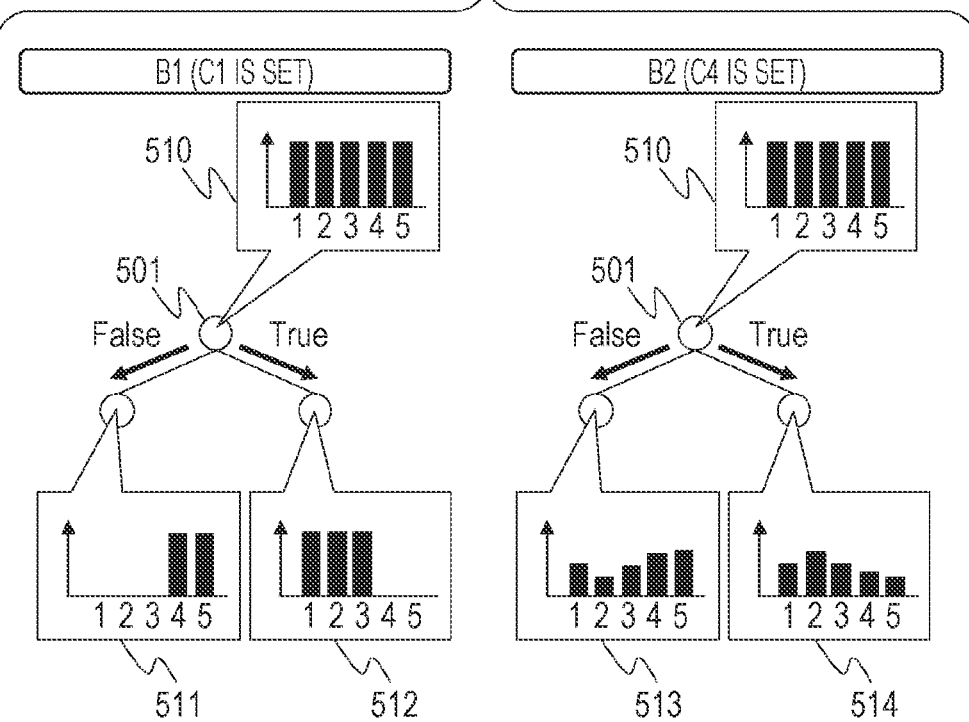

FIG. 6

INPUT

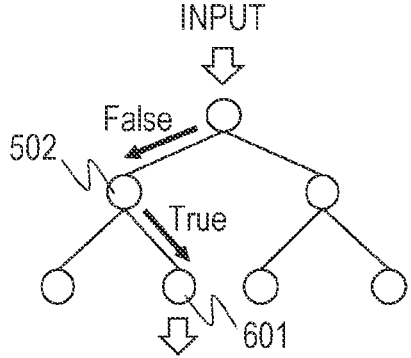

DEGREE OF SOUNDNESS 3

FIG. 7

| NODE ID | GROUNDS FOR DETERMINATION (DETERMINATION CRITERIA) | RELEVANT DEFECTIVE-STATE TYPE | INFORMATION GAIN |
|---|---|---|---|
| N502 | DOES ANY CRACK HAVING A CRACK WIDTH OF 0.5 mm OR GREATER EXIST? | CRACK | 0.32 |
| N511 | DOES ANY WATER LEAK EXIST? | WATER LEAK | 0.05 |
| N533 | LAPSE OF THIRTY YEARS OR LONGER? + DOES ANY WATER LEAK HAVING AN AREA SIZE OF 1 m² OR GREATER EXIST? | WATER LEAK | 0.21 |

 RELEVANT DEFECTIVE STATE AND DEGREE
OF IMPORTANCE
・CRACK: DEGREE OF IMPORTANCE 0.32
・WATER LEAK: DEGREE OF IMPORTANCE 0.26

FIG. 11A

Association setting 1 for a defective state existing across the border of the evaluation area

| | Pattern 1 | Pattern 2 | Pattern 3 |
|---|---|---|---|
| Crack | ○ | ● | ○ |
| Efflorescence | ○ | ● | ○ |
| Water leak | ○ | ● | ○ |
| Exposed reinforcing rod | ○ | ● | ○ |

FIG. 11B

Association setting 2 for a defective state existing across the border of the evaluation area

| | Pattern 1 | Pattern 2 | Pattern 3 |
|---|---|---|---|
| Crack | ● | ○ | ○ |
| Efflorescence | ○ | ● | ○ |
| Water leak | ○ | ● | ○ |
| Exposed reinforcing rod | ○ | ● | ○ |

FIG. 13

■ DETERMINATION RULES FOR DEGREE OF DETERMINATION 2

1301

| RULE ID | RULES FOR DETERMINATION AS DEGREE OF DETERMINATION 2 | RELEVANT DEFECTIVE STATE | DETERMINATION |
|---------|-------------------------------------------------------|--------------------------|----------------|
| R2-1 | A CRACK HAVING A CRACK WIDTH OF 1.0 mm OR GREATER EXISTS | CRACK | × |
| R2-2 | EFFLORESCENCE HAVING AN AREA SIZE OF 10 m² OR GREATER EXISTS | EFFLORESCENCE | × |
| R2-3 | A GRID CRACK (GRID PITCH: 20 cm) EXISTS | CRACK | × |
| R2-4 | LAPSE OF FIFTY YEARS OR LONGER + A GRID CRACK EXISTS | CRACK | × |
| ⋮ | ⋮ | ⋮ | ⋮ |

■ DETERMINATION RULES FOR DEGREE OF DETERMINATION 3

| RULE ID | RULES FOR DETERMINATION AS DEGREE OF DETERMINATION 3 | RELEVANT DEFECTIVE STATE | DETERMINATION |
|---------|-------------------------------------------------------|--------------------------|----------------|
| R3-1 | A CRACK HAVING A CRACK WIDTH OF 0.5 mm OR GREATER EXISTS | CRACK | ○ |
| R3-2 | EFFLORESCENCE HAVING AN AREA SIZE OF 1 m² OR GREATER EXISTS | EFFLORESCENCE | × |
| R3-3 | A GRID CRACK (GRID PITCH: 50 cm) EXISTS | CRACK | ○ |
| R3-4 | LAPSE OF TWENTY YEARS OR LONGER + A GRID CRACK EXISTS | CRACK | × |
| ⋮ | ⋮ | ⋮ | ⋮ |

FIG. 14

ITEM DEFINITION    $I_{all} = \{I1, I2, ..., IM\}$

| ITEM ID | CONTENT |
|---------|---------|
| I1 | A CRACK EXISTS |
| I2 | A CRACK HAVING A CRACK WIDTH OF 0.5 mm OR GREATER EXISTS |
| I3 | A CRACK HAVING A CRACK WIDTH OF 1.0 mm OR GREATER EXISTS |
| ⋮ | ⋮ |
| IM−1 | LAPSE OF TWENTY YEARS OR LONGER |
| IM | LAPSE OF FIFTY YEARS OR LONGER |

1401

GENERATION OF TRANSACTION DATA          ⇐          LEARNING DATA $$D_i = \{X_i : y_i\}$$

$T_i = \{I_i : y_i\}$

FREQUENT PATTERN MINING

DETERMINATION RULES

■ EX. DETERMINATION RULES FOR DEGREE OF SOUNDNESS 3

| RULE ID | ITEMSET |
|---------|---------|
| R3−1 | I2 |
| R3−2 | I5 + I10 |
| ⋮ | ⋮ |
| R3−N | I7 + I11 + I22 |

1402

INFORMATION PROCESSING APPARATUS AND INFORMATION PROCESSING METHOD

CROSS-REFERENCE TO RELATED APPLICATIONS

This application is a Continuation of International Patent Application No. PCT/JP2021/035476, filed Sep. 28, 2021, which claims the benefit of Japanese Patent Application No. 2020-164108, filed Sep. 29, 2020, and Japanese Patent Application No. 2020-164109, filed Sep. 29, 2020, both of which are hereby incorporated by reference herein in their entirety.

TECHNICAL FIELD

The present invention relates to an information processing apparatus and an information processing method, and more particularly, relates to a technique for determining a degree of soundness of a target.

BACKGROUND ART

In an inspection of a structure such as a bridge or a tunnel, a degree of soundness is determined using information on a defective state such as cracks. The degree of soundness is an index that indicates how much a structure is sound. The degree of soundness can be said also as an index that indicates how much the structure has degraded or has been damaged. In degree-of-soundness determination according to prior art, an inspection engineer who has understood predetermined determination criteria and determination rules determine the degree of soundness of a structure on the basis of information such as the number of cracks, crack widths, presence or absence of any water leak, and the like.

On the other hand, a technique for determining the degree of soundness automatically by an information processing apparatus for the purpose of reducing the burden on an inspection engineer has been disclosed. A method for determining the degree of soundness by receiving records of inspection containing defective-state size and the like as inputs and by using multiple regression analysis is disclosed in PTL 1.

CITATION LIST

Patent Literature

PTL 1 Japanese Patent Laid-Open No. 2017-173993

Non Patent Literature

NPL 1 R. Agrawal and R. Srikant: Fast algorithms for mining association rules, In Proceedings of 20th Int. Conf. Very Large Data Bases, VLDB, pp. 487-499, 1994.

NPL 2 Guozhu Dong, Jinyan Li, Efficient Mining of Emerging Patterns: Discovering Trends and Differences, KDD 1999: pp. 43-52

NPL 3 Guozhu Dong, Xiuzhen Zhang, and Limsoon Wong, CAEP: Classification by Aggregating Emerging Patterns, Proceedings of the 2nd International Conference on Discovery Science, 30-42, 1999

However, in prior art, no consideration has been given to making it easier to confirm the automatically-determined degree of soundness by an inspection engineer. It is conceivable that an inspection engineer will perform work of checking the result of automatic determination of the degree of soundness such as collating the result of determination of the degree of soundness by the inspection engineer with the result of automatic determination of the degree of soundness. When such check work is performed, according to prior-art methods, it has been impossible for a user such as the inspection engineer to understand the grounds for machine determination, for example, reasons as to which of defects the information processing apparatus relied on to determine the degree of soundness. Therefore, in prior art, a user such as the inspection engineer has been unable to understand the grounds for the result of automatic determination of the degree of soundness. For this reason, it has not been easy to confirm whether the result of automatic determination is correct or not.

SUMMARY

The present invention has been made in view of the above problem. An object of the present invention is to provide information on a defective state relevant to the determination of the degree of soundness.

To solve the above problem, an information processing apparatus according to the present invention includes: determination means configured to, based on a defective state of a structure, determine a degree of soundness that indicates how much the structure is sound; and output means configured to output information about a defective state of the structure that provides grounds for determination performed by the determination means.

Further features of the present invention will become apparent from the following description of exemplary embodiments with reference to the attached drawings.

BRIEF DESCRIPTION OF DRAWINGS

FIG. 5A is a diagram for explaining the learning of a degree-of-soundness determination method.

FIG. 5B is a diagram for explaining the learning of the degree-of-soundness determination method.

FIG. 6 is a diagram for explaining the degree-of-soundness determination method.

FIG. 7 is a diagram for explaining grounds for determination outputted by a degree-of-soundness determination unit.

FIG. 11A is a diagram for explaining another example of changing an association standard according to the first embodiment.

FIG. 11B is a diagram for explaining another example of changing an association standard according to the first embodiment.

FIG. 13 is a diagram for explaining determination rules according to a second embodiment.

FIG. 14 is a diagram for explaining the learning of a degree-of-soundness determination method according to a third embodiment.

DESCRIPTION OF EMBODIMENTS

First Embodiment

With reference to the drawings, embodiments of the present invention will now be explained. In the present embodiment, a description will be given about processing operation in an information processing method performed by an information processing apparatus 100 configured to determine a degree of soundness of a structure.

Figure 4:
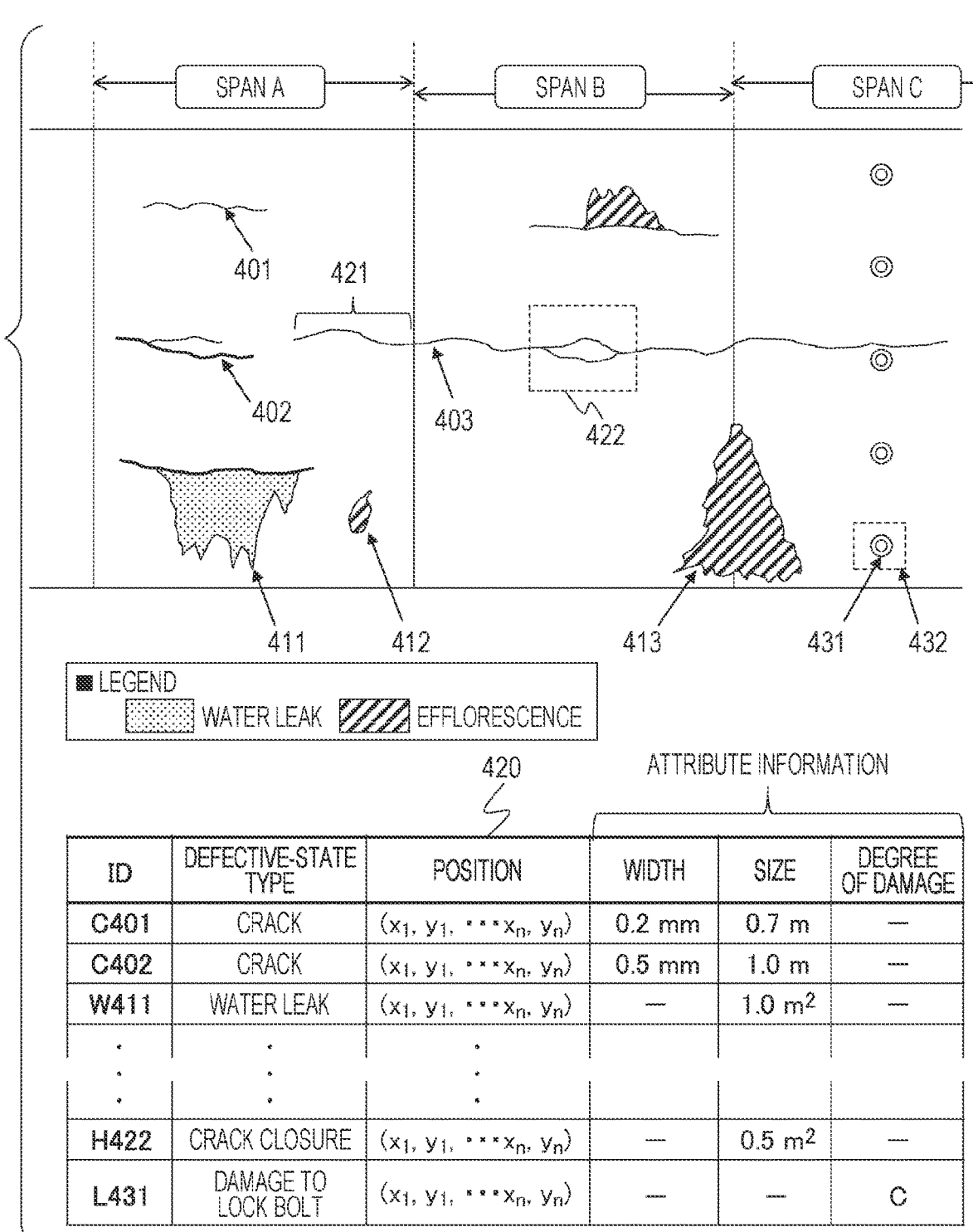
FIG. 4 is a diagram for explaining data handled by the information processing apparatus according to the present embodiment.

First, with reference to FIG. 4, data used in degree-of-soundness determination by the information processing apparatus 100 according to the present embodiment will now be explained. FIG. 4 illustrates data showing a part of a development diagram of a tunnel that is the target of an inspection. Though a tunnel is illustrated as an example of the target of an inspection in FIG. 4, the target of an inspection according to the present embodiment is not limited to a tunnel. The target of an inspection may be any other kind of a structure such as a bridge, a dam, a building, or the like.

FIG. 4 illustrates an example of display of a tunnel development diagram by the information processing apparatus 100 according to the present embodiment. The tunnel development diagram is data of superimposing a wall surface image obtained by capturing a wall surface of a tunnel on a drawing obtained by developing the tunnel. That is, in the present embodiment, the tunnel development diagram is obtained by clipping at least a part of a figure of an inner-wall portion (curved surface) of a tunnel that is a structure and/or a captured image and by placing it on a two-dimensional coordinate system. In addition, the tunnel development diagram according to the present embodiment is data obtained by developing a superimposed image, which is a superposition of a tunnel wall-surface design diagram and a captured image of an inner wall surface of a tunnel, onto a plane whose vertical axis represents the circumferential direction of the tunnel and horizontal axis represents the extending direction of the tunnel. A brief explanation of an example of a method for creating the tunnel development diagram is given below. First, a plurality of capturing devices is installed on a vehicle, and a wall surface of a tunnel is captured in an all-encompassing manner while causing the vehicle to move. Images captured in this way are laid out on a two-dimensional coordinate system, and a wall surface image is generated by stitching them together on the basis of feature-amount matching. Then, the wall surface image is aligned with a design diagram of the developed wall surface of the tunnel and is superimposed thereon after the alignment, thereby obtaining a tunnel development diagram. This alignment may be performed on the basis of an input from a user. Matching by image processing may be used for this alignment. Though it has been described that data of a tunnel development diagram obtained by superimposing a captured image of a structure on a drawing of the structure is used as data for degree-of-soundness determination performed by the information processing apparatus 100, the data used is not limited thereto. Data representing either the drawing only or the captured image only may be used.

In the above description, a tunnel, the degree-of-soundness determination target structure surface of which is a curved surface, is taken as an example, and the development diagram thereof is used as the data for the degree-of-soundness determination. However, there is no need to use a development diagram if the target surface is a plane in a three-dimensional space. In this case, a drawing of the target surface (plain) of the structure the degree of soundness of which is to be determined and/or an image obtained by capturing the target surface may be used as the data for the degree-of-soundness determination. In a case where the target surface (plain) of the structure cannot be captured in parallel with the capturing surface of the capturing device, a corrected captured image having been subjected to tilt correction may be used as the data for the degree-of-soundness determination.

In addition, in the tunnel development diagram illustrated in FIG. 4, defective-state information indicative of a defective state of the tunnel is stored in association therewith. For example, FIG. 4 illustrates that objects drawn on the basis of defective-state information stored in association with the tunnel development diagram, such as cracks 401, 402, and 403, a water leak 411, efflorescence 412 and 413, and the like, are also displayed. That is, in FIG. 4, the cracks 401, 402, and 403, the water leak 411, and the efflorescence 412 and 413, each of which is an object that enables a defective state to be identified, are also superimposed on the tunnel development diagram on the basis of defective-state information.

The crack 402 is an object drawn as a thick line and superimposed at a position where cracking is detected on the tunnel development diagram. The object for identifying a defective state is drawn in accordance with the attribute of the detected defective state. For example, an object that represents a crack may be drawn with a different color or a different line width, depending on the width of the crack. In FIG. 4, the crack 402 is drawn with a thicker line than the crack 401. This means that the crack width of the crack 402 is greater than that of the crack 401. In the present embodiment, it is assumed that information that represents a crack width such as a width of 0.2 mm or 0.5 mm is contained in defective-state information that represents each crack. A maximum crack width value of each one crack is stored as the crack width. The crack width stored as the defective-state information is not limited to the maximum value. An average value, a minimum value, or a plurality of values may be stored. The types of the defective state are not limited to these examples. An exposed reinforcing rod, a honeycomb, a rust fluid, and the like may be included.

The information processing apparatus 100 generates these kinds of defective-state information on the basis of an input from the user who has observed the defective state on the site of the target structure to be inspected. Alternatively, the user may visually confirm a wall surface image of the structure superimposed on the drawing as illustrated in FIG. 4 and input the position/range of each defective state. As still another alternative example, the result of automatic detection of the defective state by the information processing apparatus 100 on the basis of the image may be taken as the defective-state information. The automatic detection of the defective state can be performed by, for example, applying the detection target to a detection model having been subjected to machine learning in advance using existing defective-state images.

In the present embodiment, the information processing apparatus 100 stores the position and range of defective-state information that represents a crack as line-based vector data. As for kinds of defective-state information expressed in terms of an area such as a water leak and the like, the area is stored as polygon data. These vector data and polygon data will be hereinafter collectively referred to as vector data. It is assumed that the vector data is data in which the coordinates of each point are expressed on a coordinate system that is based on the drawing.

A table 420 in FIG. 4 shows an example of defective-state information. For example, defective-state information that represents a crack with an ID of C401 includes vector data on a drawing coordinate system under the heading of position and further includes information on a crack width under the heading of width. Moreover, information on a crack length is included under the heading of size. Under the heading of size, as for a defective state of each area other than cracks, the area size of the defective state is shown.

The defective-state information may include information that represents a defective state that is a combination of a plurality of defects. For example, a dotted-line frame 422 in FIG. 4 is an object drawn on the basis of defective-state information that represents a crack closure comprised of a plurality of cracks. In the table 420 of defective-state information, H422 is the identifier of this crack closure, and coordinate information that indicates the coordinates of the dotted-line frame 422 is shown under the heading of position. Examples of a defective state comprised of a plurality of cracks, besides a crack closure, are turtle-shell-pattern cracking, grid cracking, etc.

Moreover, information on a degree of damage to a predetermined portion such as a component member of the structure may also be included in the defective-state information. The degree of damage is an index that indicates how much the target is damaged. For example, the numeral 431 in FIG. 4 depicts a lock bolt of the tunnel in a wall surface image. The result of evaluating the degree of damage to this lock bolt may also be included in the defective-state information. In the table 420, L431 is the identifier of defective-state information that represents damage to the lock bolt, and coordinate information that indicates the coordinates of a range 432 of the lock bolt 431 is shown under the heading of position. The range 432 in FIG. 4 is an object drawn on the basis of defective-state information that represents damage to the lock bolt. In the table 420, under the heading of degree of damage for L431, the degree of damage to the lock bolt 431 is recorded as C. The degree of damage is rated on, for example, a three-point scale of A to C, wherein A is a most severely damaged level.

The evaluation of the degree of damage may be performed by actually checking the target on the site by a human or by visually checking an image of the target by a human. Alternatively, the information processing apparatus 100 may automatically determine the degree of damage on the basis of an image of the target. In this case, a determination model to be used for automatically determining the degree of damage on the basis of an image may be generated using machine learning, and the information processing apparatus 100 may determine the degree of damage to the target of determination with the use of this determination model. The determination model for determination of the degree of damage can be constructed by preparing a large amount of data of sets of an image of the target of determination of the degree of damage and a teacher label in advance with the use of existing data and by using the prepared data as learning data. The image of the target of determination of the degree of damage is, for example, an image of the lock bolt clipped from the wall surface image and having a size shown by the range 432 of the lock bolt in FIG. 4. The result of degree-of-damage determination performed by a human on such an image is taken as a teacher label. The learning can be performed using an arbitrary machine learning algorithm such as Deep Learning.

As described above, the defective-state information includes information on a crack width, a defective-state size, and a degree of damage. These kinds of information other than position information will be hereinafter collectively referred to as attribute information.

The defective-state information according to the present embodiment is information such as one illustrated in the table 420 of FIG. 4 as described above. As will be described later, it is assumed that the defective-state information is stored in an information storage unit 206.

Next, a degree of soundness determined in the present embodiment will now be explained. The degree of soundness is a parameter of determining how much the structure is sound by using the defective-state information having been explained above. As will be described later, the degree of soundness may be determined using specs-and-conditions information of the structure, too. It is assumed that the degree of soundness according to the present embodiment is determined for each predetermined range of the structure. For example, in the example of the tunnel illustrated in FIG. 4, the degree of soundness is determined for each construction span (will be hereinafter referred to as "span") of the tunnel. Specifically, the degree of soundness is determined for each of a span A, a span B, and a span C. The target areas of determination of the degree of soundness will be hereinafter referred to as evaluation areas. The evaluation areas are not limited to the construction spans. For example, predetermined unit areas at intervals of 10 m may be set as the evaluation areas. It is assumed that the degree of soundness is rated on a five-point scale of 1 to 5. In the evaluation of the degree of soundness, 5 is a most sound state, and 1 is a most severely damaged state of the structure. The scale for determining the degree of soundness is not limited to a five-point scale.

The configuration and processing of the information processing apparatus 100 according to the present embodiment will be described below while taking, as an example, a case where the degree of soundness is determined using the defective-state information illustrated in FIG. 4.

Figure 1:
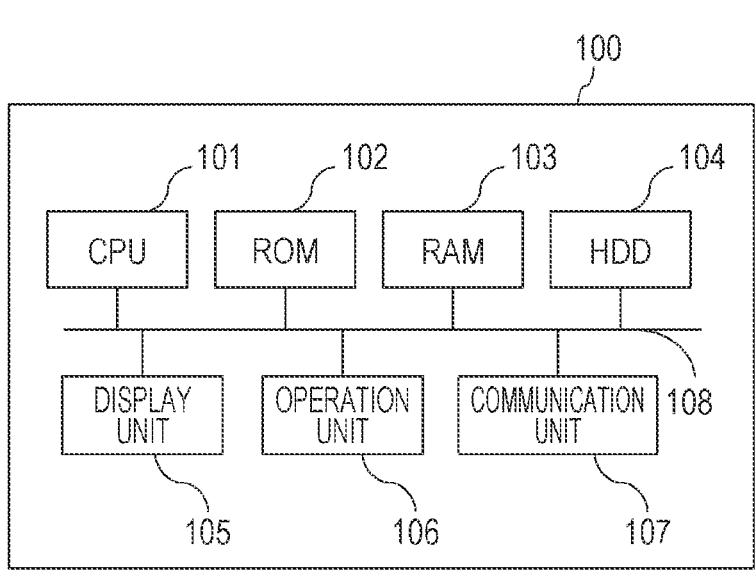
FIG. 1 is a hardware configuration diagram of an information processing apparatus according to the present embodiment.
Figure 2:
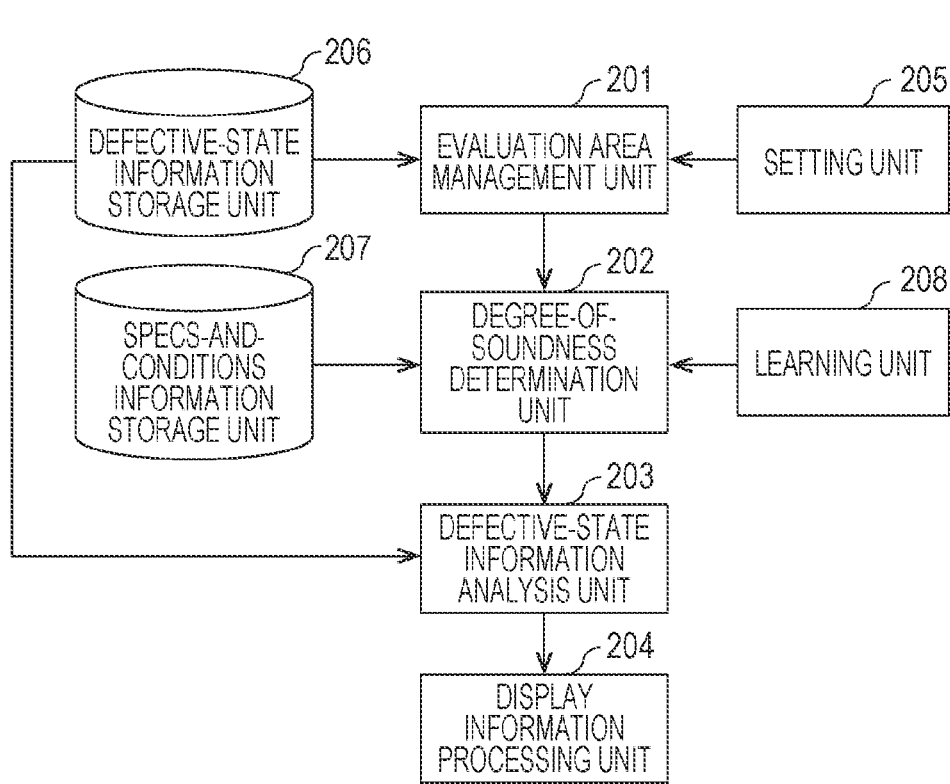
FIG. 2 is a block diagram illustrating a functional configuration of the information processing apparatus.

With reference to FIGS. 1 and 2, the configuration of the information processing apparatus 100 according to the present embodiment will now be explained.

Hardware Configuration

FIG. 1 is a hardware configuration diagram of the information processing apparatus 100 according to the present embodiment. As illustrated in FIG. 1, the information processing apparatus 100 includes a CPU 101, a ROM 102, a RAM 103, an HDD 104, a display unit 105, an operation unit 106, and a communication unit 107. The CPU 101 is a central processing unit. The CPU 101 performs computation and logical determination, etc. for various kinds of processing, and controls each constituting element connected to a system bus 108. The ROM (read-only memory) 102 is a program memory. Programs for control performed by the CPU 101, including various processing steps that will be described later, are stored in the ROM 102. The RAM (random access memory) 103 is used as the main memory of the CPU 101 and a temporary storage area such as a work area. A program memory may be realized by loading a program into the RAM 103 from an external storage device, etc. connected to the information processing apparatus 100.

The HDD 104 is a hard drive for storing electronic data and programs according to the present embodiment. An external storage device may be used as a means that fulfills a similar function. The external storage device can be realized in the form of, for example, a medium (storage medium) and an external memory drive that enables accessing the medium. As such a medium, for example, a flexible disk (FD), a CD ROM, a DVD, a USB memory, an MO, a flash memory, and the like are known. The external storage device may be a server apparatus, etc. connected via a network.

The display unit 105 is a device that outputs an image on a display screen, for example, a CRT display, a liquid crystal display, or the like. The display unit 105 outputs video in accordance with display control performed by the CPU 101. The display unit 105 may be an external device connected to the information processing apparatus 100 by means of wired or wireless connection. The operation unit 106 includes a keyboard, a mouse, and the like, and receives various kinds of operation by a user. The communication unit 107 performs wired or wireless interactive communication with another information processing apparatus, a communication device, an external storage device, etc. by utilizing known communication technology.

Though the information processing apparatus 100 will be described as a single apparatus, this is a non-limiting example. The information processing apparatus 100 may be comprised of a plurality of apparatuses. The information processing apparatus 100 may be a logical apparatus embodied virtually by a plurality of apparatuses.

Functional Configuration

FIG. 2 is an example of a block diagram illustrating a functional configuration of the information processing apparatus 100 according to the present embodiment. The information processing apparatus 100 includes an evaluation area management unit 201, a degree-of-soundness determination unit 202, a defective-state information analysis unit 203, a display information processing unit 204, a setting unit 205, a defective-state information storage unit 206, a specs-and-conditions information storage unit 207, and a learning unit 208. These functional units are embodied by loading programs stored the ROM 102 into the RAM 103 and executing processing in accordance with each step in a flowchart that will be described later by the CPU 101. Then, the result of execution of each processing is retained in the RAM 103 or stored into the HDD 104. In a case where a hardware configuration is adopted in place of software processing using the CPU 101, for example, it is possible to do so by configuring an arithmetic processor or a circuit corresponding to the processing of each functional unit described here. Each functional unit may be configured as, for example, an ASIC or an FPGA.

Next, an overview of each functional unit illustrated in FIG. 2 will now be given. The defective-state information that has been described while referring to FIG. 4 is stored in the defective-state information storage unit 206. Specs-and-conditions information of the target structure to be inspected is stored in the specs-and-conditions information storage unit 207. The specs-and-conditions information is various kinds of information about the structure. The specs-and-conditions information includes information on, for example, the number of years that have elapsed since the start of service (service years), a method of construction, a concrete type, geographical conditions such as a coast or a region of cold climate, use environment conditions such as a volume of traffic, and the like. The evaluation area management unit 201 associates defective-state information with a degree-of-soundness evaluation area on the basis of a predetermined association standard (association rule). The degree-of-soundness determination unit 202 determines the degree of soundness of the evaluation area by using the defective-state information having been associated by the evaluation area management unit 201 and by using the specs-and-conditions information. Moreover, the degree-of-soundness determination unit 202 outputs grounds for the degree-of-soundness determination. The defective-state information analysis unit 203 analyzes a defective state included in the grounds for the degree-of-soundness determination. The display information processing unit 204 displays information on a defective state relevant to the degree-of-soundness determination on the display unit 105 on the basis of the result of the analysis conducted by the defective-state information analysis unit 203. The setting unit 205 receives an input from a user via the operation unit 106 and controls an association standard for associating a defective state with an evaluation area. The learning unit 208 learns a method for determining the degree of soundness by the degree-of-soundness determination unit 202. Note that not all of these functional units do not have to be necessarily included in the information processing apparatus 100; at least a part of their functions may be implemented by an external device that can be connected to the information processing apparatus 100. Each function of the configuration may be embodied in the form of distributed processing performed by a plurality of devices.

Processing

Next, processing according to the present embodiment will now be explained. With reference to a flowchart illustrated in FIG. 3, processing according to the present embodiment will now be explained. The flow of the flowchart illustrated in FIG. 3 starts when the information processing apparatus 100 receives an instruction to perform degree-of-soundness determination.

Processing Performed by the Evaluation Area Management Unit

Figure 3:
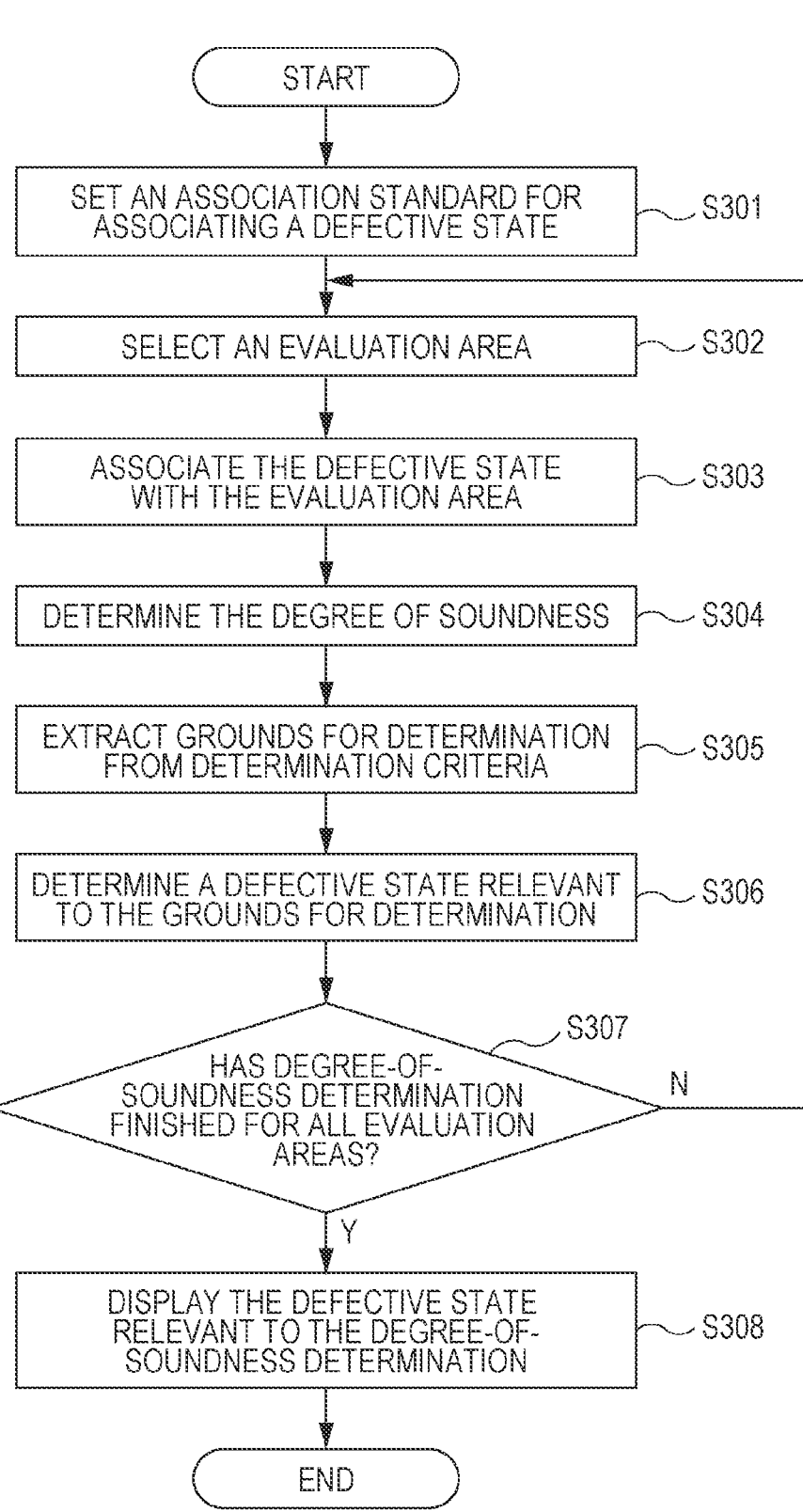
FIG. 3 is a processing flowchart according to the present embodiment.

In FIG. 3, first, processing in steps S301 to S303 is performed by the evaluation area management unit 201. The step S301 is a step of setting an association standard. The association standard is information that specifies a method for setting, for an evaluation area, defective-state information that is to be used for determining the degree of soundness. Specifically, the association standard is a judgment criterion as to, for example, whether to use a defective state that exists across the border of the evaluation area for the degree-of-soundness determination or not. The association standard can be changed by the setting unit 205, and a detailed explanation of it will be given later. It is assumed here that, in the step S301, an association standard of a default setting is taken as an association standard for performing subsequent association processing. The association standard of the default setting according to the present embodiment is assumed to be the following setting: "Defective-state information within the range of the evaluation area of the target of evaluation is used for degree-of-soundness determination."

In the present embodiment, the degree-of-soundness determination is performed one after another for the evaluation areas of the target structure to be inspected. The step S302 is a step of selecting an evaluation area as the current target of degree-of-soundness determination. In the description below, it is assumed that the span A illustrated in FIG. 4 is selected in the step S302 as the evaluation area whose degree of soundness is to be determined.

In the next step, S303, in accordance with the association standard, the evaluation area management unit 201 associates defective-state information with the evaluation area. That is, in the step S303, in accordance with the association standard, the information processing apparatus 100 selects defective-state information that is to be used for determining the degree of soundness of the evaluation area. This processing will now be explained with reference to FIG. 4.

As mentioned above, an explanation will be given while assuming that the association standard of "Defective-state information within the range of the evaluation area of the target of evaluation is used for degree-of-soundness determination", which is the default setting, was set in the step S301. In accordance with the association standard having been set, the evaluation area management unit 201 selects defective-state information included in the coordinate range of the span A out of the defective-state information storage unit 206. For example, in the range of the span A illustrated in FIG. 4, defects such as the cracks 401 and 402, the water leak 411, the efflorescence 412, etc. are included. In the step S303, defective-state information of these defects is taken as defective-state information that is to be used for the degree-of-soundness determination of the span A.

Note that the crack 403 illustrated in FIG. 4 is a crack spanning from the span A to the span C. For the crack 403, in accordance with the current association standard, a range 421, which is a portion included in the span A, of the crack 403, is taken as defective-state information that is to be used for the degree-of-soundness determination of the span A. Therefore, the evaluation area management unit 201 changes the defective-state information that represents the crack 403 into defective-state information that represents a crack portion up to the border of the span A.

Specifically, the evaluation area management unit 201 acquires the defective-state information of the crack 403 from the defective-state information storage unit 206 and changes its vector data into partial data of the range 421 only, which is included in the span A. Moreover, the evaluation area management unit 201 changes the size in the attribute information (crack length) into a partial length within the range 421. The defective-state information having been changed in this way in accordance with the association standard applied to the evaluation area is added into defective-state information that is to be used for determining the degree of soundness of the span A. The evaluation area management unit 201 may convert the defective-state information that represents the crack 403 into defective-state information that represents three crack portions that exist in the span A, the span B, and the span C respectively.

Through the above-described processing performed by the evaluation area management unit 201, defective-state information that is to be used for determining the degree of soundness of the span A is set.

Processing Performed by the Learning Unit

In the next step S304 of FIG. 3, the information processing apparatus 100 determines the degree of soundness of the evaluation area by using the defective-state information having been associated with the evaluation area by the evaluation area management unit 201 and by using the specs-and-conditions information stored in the specs-and-conditions information storage unit 207.

First, a method for determining the degree of soundness will now be explained. In the present embodiment, the degree of soundness is determined using an already-trained model based on machine learning. This learning has been performed in advance by the learning unit 208.

For the purpose of presenting grounds for the degree-of-soundness determination to the user, or for the purpose of showing information on a defective state relevant to the degree-of-soundness determination, the method for determining the degree of soundness should preferably be formulated on the basis of determination criteria that are understandable by a human. For example, binary determination is preferred determination criteria. Among machine-learning algorithms, a decision tree, which is a set of binary determinations, is an algorithm that is suited for the present embodiment. An embodiment using a decision tree in a method for determining the degree of soundness will be described below. The method for determining the degree of soundness is not limited to a decision-tree method. The degree-of-soundness determination may be performed using an already-trained model using any other machine-learning algorithm.

With regard to a method for training a determination model for the degree-of-soundness determination, first, learning data will now be explained. The learning data for the degree-of-soundness determination is created from data in which the defective-state information and the degree of soundness are already known, such as existing inspection data. A certain piece of learning data $D_i$ can be expressed as follows.

$$D_i = (X_i, y_i) \qquad \text{Formula 1}$$

$D_i$ is data regarding a certain evaluation area of a certain structure. $X_i$ is defective-state information associated with a certain evaluation area, and specs-and-conditions information of a certain structure. $y_i$ is data of the degree of soundness determined by a human using the information of $X_i$, and, in the present embodiment, denotes the degree of soundness 1 to 5. In the learning data, the degree of soundness $y_i$ shows a teacher class label. A learning data set $D = \{D_i\}$ is generated by collecting a massive amount of such learning data $D_i$.

Next, with reference to FIG. 5A, a method for learning a decision tree for degree-of-soundness determination will now be explained. A decision tree includes branch nodes 501 and 502 and a terminal node (leaf node) 503. At the branch node 501, 502, a branching direction is determined on the basis of a predetermined determination criterion. In FIG. 5A, the process goes to the node on the right side if the determination result is true and goes to the node on the left side if the determination result is false.

Next, the determination criterion at a branch node will be described. The determination criterion is a criterion for performing binary determination by using the defective-state information and the specs-and-conditions information. In a simple case, with the use of the defective-state information, the presence or absence of a defective state could be taken as the determination criterion, for example, "Does any crack exist in the evaluation area?"; "Does any water leak exist in the evaluation area?"; "Does any crack closure exist in the evaluation area?" or the like. A criterion that is based on a combination of a defective-state type and attribute information may be taken as the determination criterion. For example, as the criterion for determination using a crack width in the attribute information, it is possible to generate the following determination criterion: "Does any crack having a crack width of 0.5 mm or greater exist?"; "Does any crack having a crack width of 1.0 mm or greater exist?" or the like. That is, the presence or absence of a defective state, and the size or width of the defective state, could be taken as the criterion for determining the degree of soundness. By setting threshold values such as a width of 0.5 mm and a width of 1.0 mm for the attribute information, it is possible to generate a plurality of different determination criteria. As the criterion for determination using a defective-state size in the attribute information, it is possible to generate the following determination criterion: "Does any crack having a length of 5 m or greater exist?"; "Does any water leak having an area size of 1 m$^2$ or greater exist?" or the like. That is, the length or area size of a defective state could be taken as the criterion for determining the degree of soundness. Furthermore, as the criterion for determination using a degree of damage in the attribute information, it is possible to generate the following determination criterion: "Does any bolt whose degree of damage is rated as A exist?"; "Does any bolt whose degree of damage is rated as B exist?" or the like. That is, the degree of damage could be taken as the criterion for determining the degree of soundness. The number of defects may be taken as the criterion for determining the degree of soundness. In the present embodiment, the determination criterion is set such that, as compared with a case where there is no defective state that satisfies the determination criterion, the structure will be determined as being more unsound in a case where there is a defective state that satisfies the determination criterion.

For determination using the defective state, as described above, it is possible to generate a determination criterion on the basis of the presence or absence of a defective-state type, a defective-state type, and attribute information (the size of a defective state, etc.). The determination criterion may be generated on the basis of a combination of them. For example, the following determination criterion may be generated: "Does any efflorescence exist in addition to a crack having a crack width of 0.5 mm or greater?"

The determination criterion using the specs-and-conditions information can be generated in the same manner as the determination criterion using the defective-state information. For example, it is possible to generate the following determination criterion: "Is the number of years that have elapsed since placement in service thirty or longer?"; "Is the number of years that have elapsed since placement in service fifty or longer?"; "Is the structure located in a coast region?"; "Is the structure located in a region of cold climate?"; "Is the structure made of PC concrete?" or the like. A determination criterion that is based on a combination of the defective-state information and the specs-and-conditions information may be generated. For example, the following determination criterion can be generated: "Is the number of years that have elapsed since placement in service thirty or longer, and, in addition, does any crack having a crack width of 0.5 mm or greater exist?"

As described above, the determination criterion can be generated in a variety of patterns. In the decision-tree learning, a determination criterion that is effective for separation of learning data is selected from among such various determination criteria and is set to each branch node. As an example of a method for learning a decision tree, a learning method for setting a determination criterion to each branch node from among determination-criterion candidates that have been prepared by a human in advance will be described below.

A table 500 in FIG. 5A shows determination-criterion candidates C1 to Cn, the number of which is n and which have been prepared by a human in advance. First, processing of learning a determination criterion at the branch node 501, which is the initial one, will now be explained. In a first step of learning for the branch node 501, data classification is performed by performing binary determination using the determination-criterion candidates C1 to Cn, the number of which is n, on the learning data set D. In a second step, a determination-criterion candidate that has best classified the learning data is selected from among the results of data classification based on the n determination-criterion candidates, and the determination-criterion candidate selected as the best one is set as the determination criterion at the node 501. In the preceding sentence, "has best classified the learning data" means a state in which the degrees of soundness of the learning data set after the separation are best classified. A specific example of this will now be described while referring to FIG. 5B.

In FIG. 5B, B1 shows a state in which the determination-criterion candidate C1 "Does any crack having a crack width of 0.5 mm or greater exist?" is set for the branch node 501, and B2 shows a state in which the determination-criterion candidate C4 "Does any water leak having an area size of 1 m$^2$ or greater exist?" is set for the branch node 501. A histogram 510 is a histogram of the degrees of soundness included in the learning data set D. In this example, it is assumed that an equal number of pieces of learning data have been prepared for each of the degrees of soundness 1 to 5. In B1, pieces of learning data having been determined as false according to the determination-criterion candidate C1 are classified to the left node, and pieces of learning data having been determined as true according to the determination-criterion candidate C1 are classified to the right node. In addition, histograms 511 and 512 of the degrees of soundness of the data set having been classified to the respective nodes are illustrated. Similarly, B2 shows a state in which the learning data set has been classified by means of the determination-criterion candidate C4, and histograms 513 and 514 of the degrees of soundness for the respective nodes are illustrated. The degrees of soundness in the histograms 513 and 514 for the respective nodes in B2, as illustrated here, have not been classified enough.

By contrast, in the histograms 511 and 512 of B1, the degrees of soundness have been classified well. Specifically, the histogram 511 illustrates a state in which the pieces of learning data having been classified to the left node contain data of the degrees of soundness 4 and 5 only and in which the pieces of learning data having been classified to the right node contain data of the degrees of soundness 1, 2, and 3 only. In this case, the determination-criterion candidate C1 is a determination criterion that better classifies the learning data than the determination-criterion candidate C4. Comparison processing like this is performed on the results of classification of the learning data using the respective determination-criterion candidates, and the determination criterion that achieves the best classification is set as the determination criterion at the node.

Information gain is used as a criterion for this comparison. Information gain IG can be expressed by the following formula.

$$IG = I_G(D_p) - \frac{N_{left}}{N_p} I_G(D_{left}) - \frac{N_{right}}{N_p} I_G(D_{right}) \qquad \text{Formula 2}$$

In this formula, D denotes a data set, a suffix p denotes a parent node, a suffix left denotes a left child node, a suffix right denotes a right child node, $I_G$ denotes Gini impurity, and N denotes the number of pieces of data in the data set. The greater the value of the information gain IG is, the better the classification of the data is; therefore, the information gain IG is calculated for the results of classification based on the respective determination-criterion candidates, a determination-criterion candidate that achieves the greatest information gain IG is selected, and the selected determination-criterion candidate is set as the determination criterion at the node.

Moreover, since the information gain IG indicates the determination performance of each node, it can be used for calculating the degree of importance of the determination criterion, which will be described later. Therefore, the information gain IG of each node calculated during the process of the decision-tree learning is stored as information about said each node, together with the determination criterion.

In this way, it is possible to decide the determination criterion to be set for the node 501. In learning for the next node, a determination criterion that achieves the best data classification for the learning data set having been subjected to classification on its upper parent node is selected in the same manner as above. It is possible to proceed with the decision-tree learning by repeating this routine.

As a method for ending the decision-tree learning, there exists a method of repeating the classification process until a single degree of soundness only becomes included in the histogram at the node. However, in general, a decision tree having been learned using this method has a tendency of overlearning. Therefore, preferably, learning is performed up to a preset depth (tier) of nodes. In the example illustrated in FIG. 5A, the learning is terminated at the third tier in depth. As a result, terminal nodes (leaf nodes) are generated, for example, as shown by the node 503 in FIG. 5A. In FIG. 5A, a histogram 505 of degrees of soundness of a learning data set at the terminal node 503 is illustrated. Since the histogram 505 includes a plurality of degrees of soundness, a degree of soundness of the most populated bin is selected here as the degree of soundness indicated by the terminal node. In FIG. 5A, the degree of soundness indicated by the terminal node 503 is a degree of soundness 5.

Processing Performed by the Degree-of-Soundness Determination Unit

In the step S304 of FIG. 3, degree-of-soundness determination is performed on the determination target data by using the degree-of-soundness determination model having been trained as described above. FIG. 6 is a diagram for explaining processing for determining the degree of soundness. First, the defective-state information of the evaluation area and the specs-and-conditions information thereof are inputted as input data. Then, with the use of the determination criterion at each node, branching to a child node is performed. Assume that the outcome of the branching is a terminal node 601 in FIG. 6. In addition, assume that the degree of soundness indicated by the terminal node 601 is a degree of soundness 3. Consequently, the degree of soundness of the input data is determined as the degree of soundness 3.

In the above description, as a method for learning a decision tree, a method of preparing determination-criterion candidates in advance and setting a determination criterion at each branch node from among the determination-criterion candidates has been explained. The method for learning the determination criterion at the node is not limited thereto; any other method may be used. For example, at the time of learning for each node, a plurality of determination-criterion candidates may be generated randomly, and a determination criterion that achieves the highest classification performance may be selected from among these determination-criterion candidates. As a specific example of a method for generating a determination-criterion candidate randomly, first, a defective-state type and a type of the specs-and-conditions information are selected randomly. In addition, a threshold value of the attribute information is also selected randomly. A determination-criterion candidate is generated as a combination of the defective-state type, the type of the specs-and-conditions information, and the threshold value of the attribute information. The generation of a determination-criterion candidate based on such random selection is repeated more than once, thereby creating a plurality of determination-criterion candidates. Moreover, these determination-criterion candidates may be combined to generate determination-criterion candidates comprised of a variety of combinations of pieces of the defective-state information and/or pieces of the specs-and-conditions information such as C7 and C8 in FIG. 5.

Furthermore, the degree-of-soundness determination unit 202 extracts the determination criterion relevant to the degree-of-soundness determination from among the determination criteria of the method for determining the degree of soundness, and outputs it as the grounds for the determination. This processing corresponds to a step S305 of FIG. 3. In the present embodiment, the determination criterion at the node where the determination result is true, among the nodes of the decision tree, is taken as the grounds for the determination. For example, in FIG. 6, the determination result is true at the node 502. Assume that the determination criterion at the node 502 is: "Is the total length of the crack 10 m or greater?" In this case, "Is the total length of the crack 10 m or greater?" is the grounds for the determination. In FIG. 6, which shows a simple example, the number of the grounds for the determination is just one; however, if the determination result is true at a plurality of nodes of the decision tree, the degree-of-soundness determination unit 202 outputs a plurality of grounds for the determination. Though it has been described that the determination criterion at the node(s) where the determination result is true is taken as the grounds for the determination, this is a non-limiting example. For example, the determination criterion at the node(s) where the determination result is false, among the nodes of the decision tree, may be taken as the grounds for the determination.

Processing Performed by the Defective-State Information Analysis Unit

Next, processing in a step S306 of FIG. 3 will now be explained. The processing in the step S306 is performed by the defective-state information analysis unit 203. The defective-state information analysis unit 203 analyzes the defective state relevant to the degree-of-soundness determination on the basis of the grounds for the determination, which has been outputted by the degree-of-soundness determination unit 202. One of specific processing of analyzing the defective state is to identify the defective-state type included in the grounds for the determination. In the example illustrated in FIG. 6, "Is the total length of the crack 10 m or greater?" has been outputted as the grounds for the determination from the degree-of-soundness determination unit 202. In this case, the defective-state information analysis unit 203 identifies the defective state providing the grounds for the degree-of-soundness determination of the target evaluation area.

FIG. 7 illustrates information outputted by the degree-of-soundness determination unit 20 as the grounds for the degree-of-soundness determination of the span A of the tunnel illustrated in FIG. 4. A further explanation of the embodiment of identifying the defective state relevant to the degree-of-soundness determination will now be given while using this example. In addition, calculation of the degree of importance will also be explained.

FIG. 7 illustrates a result of extraction of three determination criterions as the grounds for the determination when the degree of soundness of the span A is determined to be a degree of soundness 3. FIG. 7 illustrates a case where input data is determined to be true at nodes N502, N511, and N513 of a decision tree when the defective-state information of the span A and the grounds for the determination are inputted into the decision tree. That is, the span A is determined to have the degree of soundness 3 on the basis of the determination criterions at the nodes N502, N511, and N513. The degree-of-soundness determination unit 202 takes these determination criterions as the grounds for the determination. The grounds for the determination obtained in this way, and information relevant to the grounds for the determination, are illustrated in FIG. 7. The defective-state information analysis unit 203 takes the defective-state type included in the grounds for the determination as the defective state relevant to the degree-of-soundness determination. From the grounds for the determination illustrated in FIG. 7, as shown under the heading of relevant defective-state type, "crack" and "water leak" are identified as the defective state relevant to the degree-of-soundness determination.

Next, processing for calculating the degree of importance of the defective state relevant to the degree-of-soundness determination will now be explained. In the example illustrated in FIG. 7, as described earlier, information gain at the time of learning is stored for each node of the decision tree. In FIG. 7, values of the information gain at the nodes N502, N511, and N513 of the decision tree are stored. The degree of importance is calculated for each defective-state type by calculating a sum of values of the information gain for each defective-state type of the defective state relevant to the degree-of-soundness determination. The degree of importance is an index that indicates how much this type of the defective state contributes to the result of the degree-of-soundness determination. In the example illustrated in FIG. 7, since the node relevant to "crack" is the node N502, the degree of importance of "crack" is 0.32. The nodes relevant to "water leak" are the nodes N511 and N513. Accordingly, the degree of importance of "water leak" is 0.26, which is the sum of the values of the information gain of them.

An embodiment of calculating the degree of importance for each defective-state type on the basis of the information gain stored for the nodes of the decision tree has been described above. The method for calculating the degree of importance for each defective-state type is not limited thereto; any other method may be used for the calculation. For example, the number of times the defective-state type appears in the grounds for the determination may be taken as the degree of importance. In a case where the number of times the defective-state type appears in the grounds for the determination is taken as the degree of importance, in the example illustrated in FIG. 7, the degree of importance of "crack" is 1 because "crack" appears in the grounds for the determination at the node N502 only. The degree of importance of "water leak" is 2 because of its appearance at the nodes N511 and N533.

Moreover, the defective-state information analysis unit 203 acquires position information on each individual defect relevant to the degree-of-soundness determination. Specifically, the defective-state information analysis unit 203 identifies defects relevant to the degree-of-soundness determination from among the defects in the evaluation area, and acquires their positions from the defective-state information storage unit 206. For example, in FIG. 7, the grounds for the determination at the node N502 is "Does any crack having a crack width of 0.5 mm or greater exist?"; therefore, the crack having a crack width of 0.5 mm or greater is extracted from among the defects in the evaluation area. Then, position information on the crack having a crack width of 0.5 mm or greater (vector data) is acquired from the defective-state information storage unit 206. The grounds for the determination at the node N511 is "Does any water leak exist?" Therefore, the water leak is extracted from among the defects in the evaluation area. Then, position information on the water leak is acquired from the defective-state information storage unit 206. The grounds for the determination at the node N533 is "Is the number of years that have elapsed thirty or longer, and, in addition, does any water leak having an area size of 1 m$^2$ or greater exist?" Since the position information on the water leak has already been acquired, processing for position-information acquisition regarding this grounds for the determination is skipped.

As described above, in the step S306, the defective-state information analysis unit 203 identifies the defective state relevant to the grounds for the determination, acquires position information thereon, and calculates the degree of importance of each type of the defective state. Moreover, the defective-state information analysis unit 203 identifies the defective state satisfying the determination criterion taken as the grounds for the determination. In the processing described below, the defective state relevant to the degree-of-soundness determination is visualized using these pieces of information generated by the defective-state information analysis unit 203.

In the next step S307 of FIG. 3, if degree-of-soundness determination processing has finished for all of the evaluation areas of the target structure to be inspected, the process proceeds to a step S308. If not all of the evaluation areas of the target structure to be inspected have undergone the degree-of-soundness determination processing yet, the process returns to the step S302, another evaluation area is selected, and the above-described processing from the step S303 to the step S306 is performed.

Processing Performed by the Display Information Processing Unit

Figure 8:
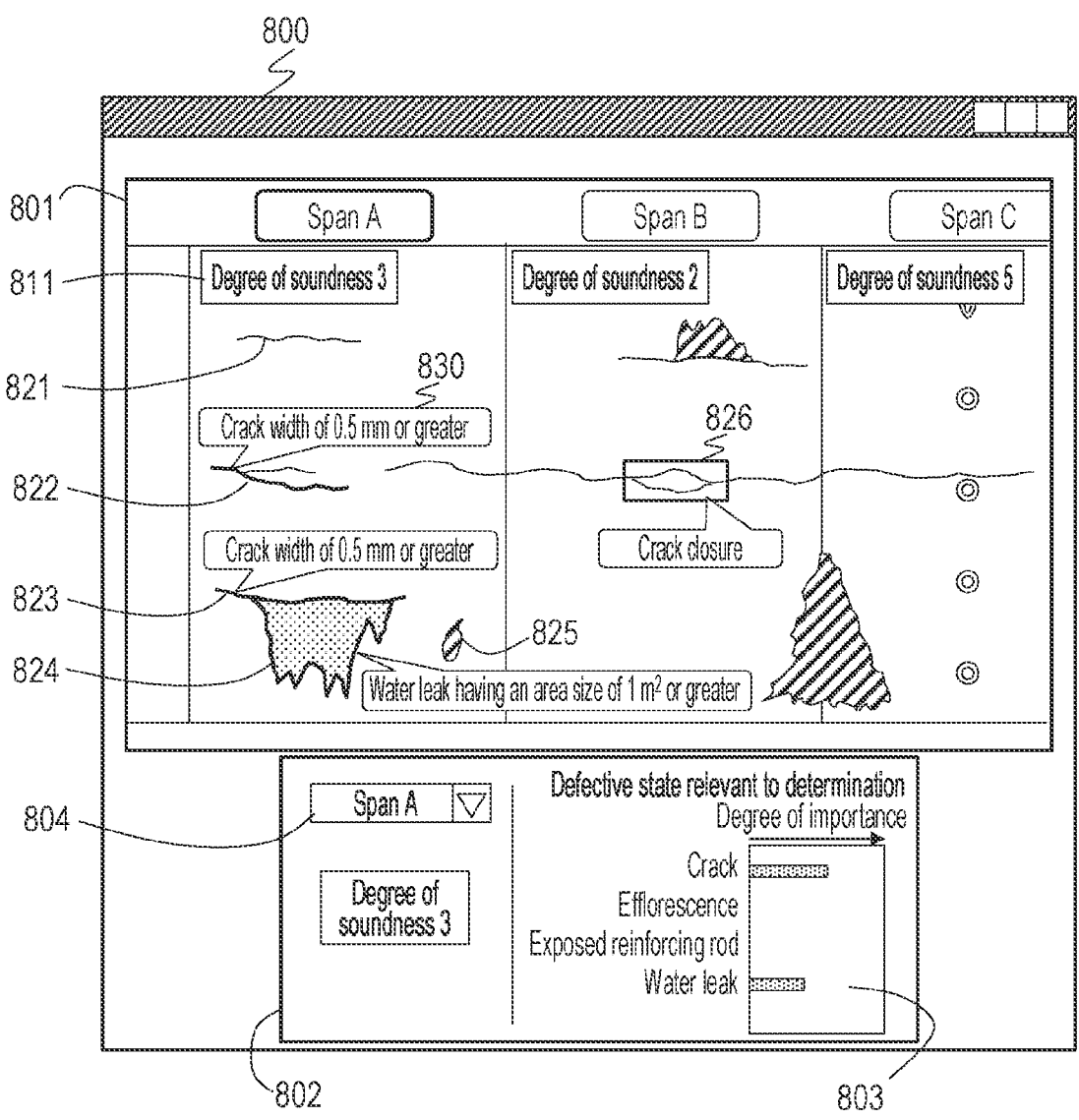
FIG. 8 is a diagram for explaining an example of display information according to a first embodiment.

The processing in the step S308 of FIG. 3 is performed by the display information processing unit 204. The display information processing unit 204 generates and outputs display information, which shows the results of the degree-of-soundness determination and information on the defective state relevant to the degree-of-soundness determination, and causes the display unit 105 to display the display information. That is, the display information processing unit 204 generates and outputs information about the defective state satisfying the determination criterion taken as the grounds for the determination. FIG. 8 illustrates an example of the information generated by the display information processing unit 204 and displayed on the display unit 105. With reference to this image, the display information processing unit 204 will be described below.

A display window 800 illustrated in FIG. 8 is an application window of a GUI. The display window 800 includes an image display area 801 and a degree-of-importance display area 802. First, in the image display area 801, the information described earlier with reference to FIG. 4 is displayed. Specifically, the drawing of the structure, the image of the structured superimposed on the drawing, and the defective-state information are displayed. The defective-state information is displayed in a superimposed manner by means of polylines and polygons thereon on the basis of the vector data of the position information. In addition, the result of the degree-of-soundness determination is displayed for each evaluation area. For example, the numeral 811 shows the result of the degree-of-soundness determination of the span A.

In the image display area 801, the defective state relevant to the degree-of-soundness determination is displayed in a highlighted manner on the basis of the information generated by the defective-state information analysis unit 203. For example, cracks 822 and 823 are displayed in a highlighted manner because they have a crack width of 0.5 mm or greater and are relevant to the degree-of-soundness determination. On the other hand, a crack 821 is not displayed in a highlighted manner because it has a crack width less than 0.5 mm and was not selected as the grounds for the degree-of-soundness determination. In FIG. 8, as an example of highlighted display, the cracks 822 and 823 are displayed by means of thicker polylines than the crack 821, which was not selected as the grounds for the degree-of-soundness determination. The method for highlighted display is not limited thereto. Any other display method may be used. For example, the defective state may be displayed using an easily-noticeable color such as red or may be displayed in a blinking manner. As other examples of highlighted display, the defective state providing the grounds for the degree-of-soundness determination may be circled, or enclosed by a predetermined object.

Similarly, a water leak 824 is displayed using a thicker-line contour for its area as the defective state relevant to the degree-of-soundness determination. On the other hand, the contour of efflorescence 825 is not displayed in a highlighted manner because it was not selected as the grounds for the degree-of-soundness determination. The defective state relevant to the degree-of-soundness determination may be extracted and displayed in another display area that makes it possible to know that the defective state displayed therein provides the grounds for the degree-of-soundness determination.

In a case where the defective state relevant to the degree-of-soundness determination is a combination of a plurality of defects or relates to a degree of damage to a predetermined portion such as a component member of the structure, its area may be displayed in a highlighted manner. For example, assume that the grounds for the degree-of-soundness determination of the span B having been determined to have a degree of soundness 2 in FIG. 8 is a crack closure. In FIG. 8, a range 826 enclosing the crack closure is displayed in a thick-line-highlighted manner. Moreover, though not illustrated in FIG. 8, for example, if the degree of damage to a lock bolt is relevant to the degree-of-soundness determination, the lock bolt portion may be displayed in a highlighted manner.

Furthermore, information about the grounds for the determination may be displayed for the defective state relevant to the degree-of-soundness determination in the image display area 801. For example, a comment balloon 830 shows that the crack 822 is relevant to the degree-of-soundness determination because it satisfies the determination criterion "Does any crack having a crack width of 0.5 mm or greater exist?" The position where the comment balloon 830 is to be displayed may be determined on the basis of the position information of the defective state acquired by the defective-state information analysis unit 203.

The degree of soundness of the span C is a degree of soundness 5. In the degree of soundness 5, no unsound defect is included, and no defective state relevant to the degree-of-soundness determination exists. Therefore, the highlighted display of the defective state relevant to the degree-of-soundness determination is not performed in the evaluation area of the span C.

Next, the content of display in the degree-of-importance display area 802 will be described. In the present embodiment, the degree of importance of each defective-state type is displayed on an evaluation-area-by-evaluation-area basis. The degree-of-importance display area 802 illustrated in FIG. 8 displays the degree of importance of each defective-state type for the degree-of-soundness determination of the span A. By operating a pull-down menu 804 or the like, the user is able to switch the evaluation area the degree of importance of which the user wants to browse. As described earlier, the degree of importance is calculated by the defective-state information analysis unit 203, and, in FIG. 8, the calculation results are displayed in a degree-of-importance bar chart 803. This display shows that the defective-state types relevant to the degree-of-soundness determination of the span A are "crack" and "water leak" and that "crack" is especially relevant to the determination.

The information on the degree of importance may be used for controlling the degree of highlighting in the highlighted display of the defective state in the image display area 801. The degree of highlighting may be controlled depending on the degree of importance of the defective state; for example, the greater the importance of the defective state is, the more highlighted the display of it may be, by making its display line thicker, or the like. Specifically, in the example illustrated in FIG. 8, since the degree of importance of "crack" is higher than that of "water leak", the cracks 822 and 823 are displayed in a more highlighted manner by making their lines thicker than the contour of the water leak 824.

The above display of the results of the degree-of-soundness determination and the information on the defective state relevant to the degree-of-soundness determination as illustrated in FIG. 8 makes it easier for the user to understand the defective state relevant to the degree-of-soundness determination. This makes it easier for the user to check the degree of soundness having been determined automatically by the information processing apparatus 100. In particular, displaying not only the grounds for the determination (determination criterion) but also the position of the defective state relevant to the degree-of-soundness determination and the degree of importance thereof makes it easier to understand the relationship between the determination result and the defective state.

Figure 9:
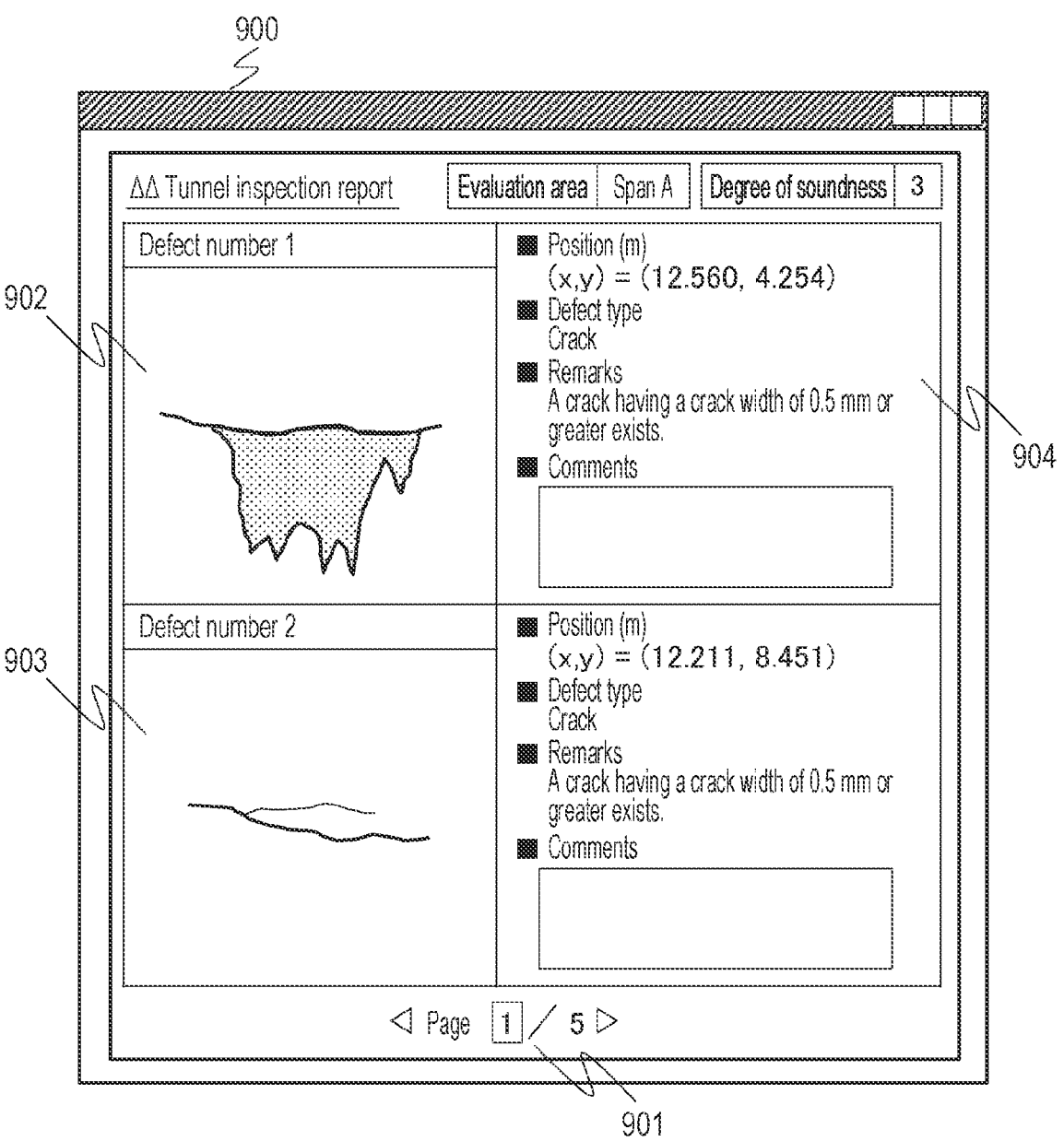
FIG. 9 is a diagram for explaining another example of display information according to the first embodiment.

Next, another example of a method for displaying the defective state relevant to the degree-of-soundness determination will be described. In FIG. 9, the defective state providing the grounds for the degree-of-soundness determination is displayed in the form of an inspection report on the basis of the information generated by the defective-state information analysis unit 203. In general, in an inspection report, an image(s) of an important defective-state portion(s) and information about it are recorded. A defective state relevant to the degree-of-soundness determination is an important defective state when an inspection is conducted. Automatically organizing information about it in the form of an inspection report simplifies document preparation work of the user.

A display window 900 illustrated in FIG. 9 displays that the degree of soundness of the span A is a degree of soundness 3, and displays information about the defective state relevant to this degree-of-soundness determination. In FIG. 9, images of two defects labeled with a damage number 1 and a damage number 2, and information about the defects, are displayed. In FIG. 9, a page next/back function 901 is provided, and information about a plurality of defects is organized in the form of an inspection report. When defects are numbered and laid out sequentially as in the damage numbers 1 and 2, the order of display may be determined on the basis of their degrees of importance. For example, defects may be laid out in a descending order of their degrees of importance such that a defect that is more important for the degree-of-soundness determination will be displayed earlier.

An area image of the defective state providing the grounds for the degree-of-soundness determination, such as an image 902, is generated by being clipped from the image superimposed on the drawing, on the basis of the position information of the defective state acquired by the defective-state information analysis unit 203. Specifically, on the basis of the position information of the defective state on the drawing coordinate system, the coordinates of a rectangular range enclosing it is determined. Since the image is superimposed on the drawing, the image has a common coordinate system in relation to the drawing or a convertible coordinate system. Therefore, it is possible to generate an image like the image 902 by clipping an image range indicated by the coordinates of the rectangle. Specifically, the image 902 is an image obtained by clipping the neighborhood of the crack 823 on the basis of the coordinates of the crack 823 illustrated in FIG. 8. Similarly, an image 903 is an image obtained by clipping the neighborhood of the crack 822.

Moreover, in a defective-state information display area 904, information about the coordinates of the defective state, and the name of the type of the defective state, are displayed. The grounds for the determination may be converted into a non-jargon text and may be displayed as findings information. For example, a sentence "Does any crack having a width of 0.5 mm or greater exist?" is displayed as findings information generated from the information of the grounds for the determination in the defective-state information display area 904. Furthermore, the defective-state information display area 904 may have a comment box as a function for preparing an inspection report.

An embodiment of displaying the defective state relevant to the degree-of-soundness determination in the form of an inspection report has been described above with reference to FIG. 9. In the example illustrated in FIG. 9, a function of outputting the data of the inspection report in a format of an arbitrary text file may be further provided.

Methods for displaying the defective state relevant to degree-of-soundness determination have been described above. The user checks the result, and adjusts the result of the degree-of-soundness determination if the result of automatically determining the degree of soundness is different from the user's determination. As a method for adjusting the result, there is a method of correcting the defective-state information itself. Specifically, for example, if the recorded crack can be determined to be erroneous, the user deletes the crack information thereof or additionally writes a crack. It is possible to adjust the result of the degree-of-soundness determination by correcting the record of the defective state as mentioned here and then performing a degree-of-soundness determination again.

As another method for adjusting the result of the degree-of-soundness determination, there is a method of changing the association standard for associating the defective state with the evaluation area. For example, in the above embodiment, the defective state is associated with the evaluation area in accordance with the association standard of determining the degree of soundness by using only the defective state existing within the range of the evaluation area, and then the degree of soundness is determined. When the degree of soundness is determined after changing the association standard applied to the evaluation area, for example, to a standard of "associating the whole of a defective state existing across the border of the evaluation area with the evaluation area, and then determining the degree of soundness", it could happen that the result of determining the degree of soundness changes.

For example, with regard to the crack 403 illustrated in FIG. 4, in the above embodiment, it has been described that the crack portion 421 only, which is within the range of the span A, is used for determining the degree of soundness of the span A. On the other hand, if the whole of the crack 303 is used for determining the degree of soundness of the span A, there is a possibility that the degree of soundness might be determined to be worse than the result of the degree-of-soundness determination of the above embodiment because of a greater total length of the crack used for determining the degree of soundness of the span A. As mentioned here, the result of the degree-of-soundness determination changes depending on how to associate the defective state with the evaluation area whose degree of soundness is to be determined; therefore, the method as to how to associate the defective state with the evaluation area is one of methods for adjusting the result of the degree-of-soundness determination.

A method for adjusting the degree of soundness by changing the association standard of the evaluation area management unit 201 via the setting unit 205 will be described in detail below.

Processing Performed by the Setting Unit

The setting unit 205 sets the association standard by performing information display on the display unit 105 described below and receiving a user input via the operation unit 106.

In general, the degree of soundness is determined for each portion of a structure. For example, if the structure is a bridge, the degree of soundness is determined for each portion thereof such as its slab and pier. If the structure is a tunnel, the degree of soundness is determined for each construction span. Alternatively, in some instances an arbitrary area such as a part of a component member is taken as an evaluation area. As described here, in the degree-of-soundness determination, the degree of soundness is determined for each predetermined evaluation area. In Japanese Patent No. 4,279,159, the degree of soundness of each span of a tunnel is determined automatically by an information processing apparatus.

When the degree of soundness of a predetermined evaluation area is determined, the defective state associated with the evaluation area is identified, and the degree of soundness of the evaluation area is determined on the basis of the associated defective state. However, for example, with regard to a defective state that is present across a border of an evaluation area, there exists a plurality of association methods for the evaluation area, and, depending on which of the association methods is used, there is a possibility that the result of the degree-of-soundness determination might vary. For example, assume that, in a case where the degree of soundness is determined on the basis of the length of a crack, the longer the crack included in an evaluation area is, the lower the determined degree of soundness will be (the less sound). Under this assumption, if a crack that extends across a border of the evaluation area exists, there is a possibility that the result of the degree-of-soundness determination might vary depending on whether the degree of soundness is determined on the basis of the length of a crack portion that is within the evaluation area or the degree of soundness is determined on the basis of the length of the crack inclusive of a range beyond the border of the evaluation area.

In prior art, when the degree of soundness is determined automatically, for such a case, for example, no consideration has been given to setting an association with the evaluation area for a defective state that is present across the border of the evaluation area. Therefore, in prior art, it has been impossible to perform an appropriate degree-of-soundness determination while taking into consideration that the degree of soundness could vary depending on the setting of association with evaluation area and making comparisons therebetween.

Processing performed by the setting unit 205 has been devised in view of the above problem. Provided herein is a technique for making it possible to set a defective state to be associated with an evaluation area when the degree of soundness of a structure is determined, and thus for obtaining a more appropriate degree-of-soundness determination result.

Figure 10:
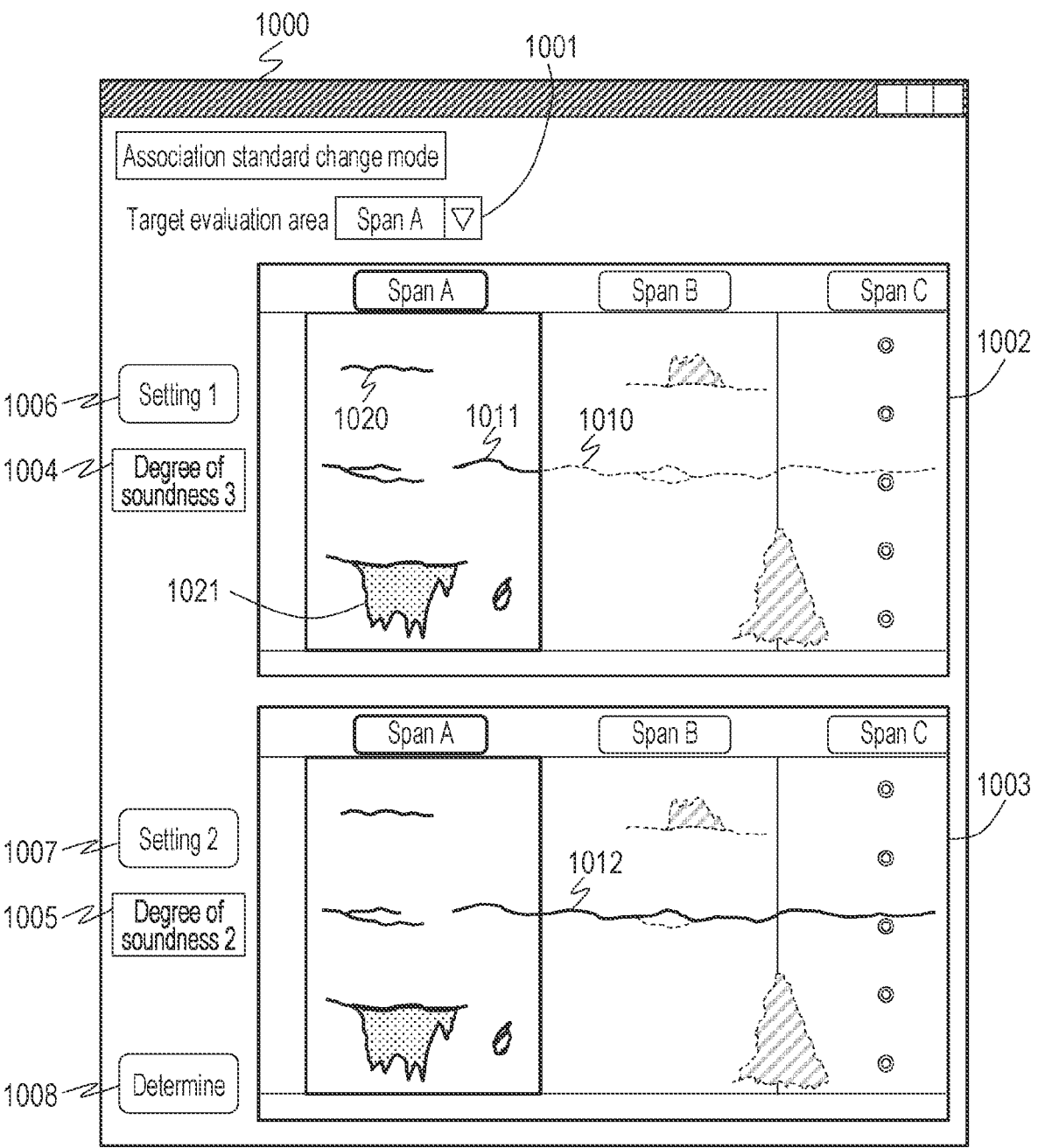
FIG. 10 is a diagram for explaining an example of changing an association standard according to the first embodiment.

Described below is an embodiment of, after determining the degree of soundness through the processing having been described heretofore, performing a degree-of-soundness determination adjustment by changing the association standard for associating the defective state with the evaluation area. In FIG. 10, the display unit 105 for a case where the degree of soundness is adjusted by changing the association standard is illustrated. FIG. 10 illustrates a display window 1000 in a state of changing the association standard applied to the span A. The user can change the target evaluation area for which the association standard is to be changed by operating, for example, a pull-down menu 1001.

In an image display area 1002 of the display window 1000, similarly to the image display area 801 illustrated in FIG. 8, the image of the tunnel wall surface superimposed on the tunnel drawing, and the defective-state information, are displayed. In addition, in a degree-of-soundness display area 1004, the result of the degree-of-soundness determination according to the embodiment described above is displayed as "a degree of soundness 3". Moreover, in the image display area 1002, the association of the defective state with the span A, which is the evaluation area, is displayed. In the embodiment described above, the defective-state information is associated with the evaluation area in accordance with the association standard of the default setting. The association standard of the default setting is "to use the defective state within the range of the evaluation area for the degree-of-soundness determination". Therefore, in the image display area 801, the defective state that exists within the range of the span A such as a crack 1020 and a water leak 1021 is displayed in a highlighted manner as being associated with the span A. Specifically, in FIG. 10, the lines and contour existing within the range of the span A are shown using thick solid lines. On the other hand, the defective state that is not associated with the span A (defects in the spans B and C) is shown using dotted lines.

Though a crack 1010 is a defective state spanning from the span A to the span C, according to this association standard, a crack portion 1011 only, which is within the range of the span A, is associated with the span A. Therefore, the portion 1011 only of the crack 1010 is displayed in a highlighted manner. As explained here, the defective state associated with the predetermined evaluation area is displayed in a highlighted manner in the image display area 1002 illustrated in FIG. 10. In this way, in the present embodiment, the defective state associated in accordance with the set association standard is displayed in such a manner that the user will be able to recognize it. This makes it easier for the user to understand which of defects is/are associated with a certain evaluation area for the purpose of determining the degree of soundness of the evaluation area.

In the display window 1000 illustrated in FIG. 10, the user is able to confirm the association of the defective state with the evaluation area by pressing a setting button 1006. In FIG. 11A, an association standard setting screen displayed in response to the pressing of the setting button 1006 is illustrated. On this screen, a method of associating a defective state that exists across the border of the evaluation area with the evaluation area is displayed for each type of the defective state such as "crack" and "efflorescence". In this embodiment, three types of association standard, association standards 1 to 3, have been prepared for a defective state that exists across the border of the evaluation area. The user sets any one of these association standards individually for each defective-state type. The association standard 1 (pattern 1) is "to, for a defective state that exists across the border of the evaluation area, use the whole of the defective state for determining the degree of soundness". The association standard 2 (pattern 2) is "to, for a defective state that exists across the border of the evaluation area, use only a part of the defective state within the range of the evaluation area for determining the degree of soundness". The pattern 2 is the association standard set as the default setting having been explained above. The association standard 3 (pattern 3) is "to exclude a defective state that exists across the border of the evaluation area from those used for determining the degree of soundness of the evaluation area". In FIG. 11A, for each defective-state type, a setting state of an association pattern set from among these patterns for a defective state that exists across the border of the evaluation area is illustrated. In FIG. 11A, as the association standard of the default setting, the association pattern 2 is preset for all of the defective-state types.

Next, an image display area 1003, etc. present at the lower portion of the display window 1000 illustrated in FIG. 10 will be explained. They are displayed for adjusting the setting of the association standard for associating the defective state with the evaluation area. With this display, and by performing operations described below, the user is able to set an association standard that is different from the association standard (hereinafter referred to as "setting 1") displayed at the upper portion of the display window 1000, and command that the degree-of-soundness determination be performed again, thereby adjusting the result of the degree-of-soundness determination.

Steps for performing the degree-of-soundness determination adjustment by changing the association standard will now be explained. First, when a setting button 1007 is pressed by the user, an association standard setting screen illustrated in FIG. 11B is displayed. This screen is similar to the screen illustrated in FIG. 11A. The user is able to select an association standard that the user wants to be applied, for each defective-state type, by clicking a radio button. An example of changing the association pattern to the pattern 1 for "crack" only from the setting 1 illustrated in FIG. 11A is illustrated here. This setting will be hereinafter referred to as "setting 2". The defective state associated with the span A in accordance with the setting 2 is displayed in the image display area 1003 illustrated in FIG. 10. Unlike the image display area 1002 according to the setting 1, in the image display area 1003, the whole of a crack 1012 that exists across the border of the evaluation area (the span A) is associated with the evaluation area, and the whole of the crack 1012 is displayed in a highlighted manner.

In the step S301 of FIG. 3, it is possible to set the association standard on the basis of user instructions as described here. For example, after setting the association standard of the setting 2, the user presses a determination button 1008 in order to determine the degree of soundness on the basis of this association standard. In response to the pressing of this button, processing in the steps S302 to S306 of FIG. 3 is executed, and the degree of soundness of the span A is determined (in the step S302, the span A is selected as the evaluation area). The determination result is displayed in a degree-of-soundness display box 1005. In FIG. 10, the result of the degree-of-soundness determination before changing the association standard is displayed in the degree-of-soundness display box 1004, and the result of the degree-of-soundness determination after changing the association standard is displayed in the degree-of-soundness display box 1005. Since the degree of soundness before the change and the degree of soundness after the change are displayed on the same screen, the user is able to compare the results and determine which of these results of the degree-of-soundness determination should be adopted. Though an embodiment in which the processing for determining the degree of soundness is executed in response to the user's pressing the determination button 1008 has been described above, the processing for determining the degree of soundness may be executed at the timing of setting the association standard. With the processing performed by the setting unit 206, it is possible to obtain a more appropriate degree-of-soundness determination result by setting a defective state to be associated with an evaluation area when the degree of soundness of a structure is determined.

With the method described above, it is possible to adjust the result of the degree-of-soundness determination by changing the association standard for associating the defective state with the evaluation area. Though an example in which the association standard applied to the span A only is changed has been described above, batch processing for changing the association standard for all evaluation areas together may be performed, and then, processing for determining the degree of soundness may be performed again.

In the embodiment described above, a span of a tunnel is taken as an example of the evaluation area. However, the evaluation area is not limited thereto. Any range may be taken as the evaluation area as long as it is a predetermined range for determining the degree of soundness.

Figure 12:
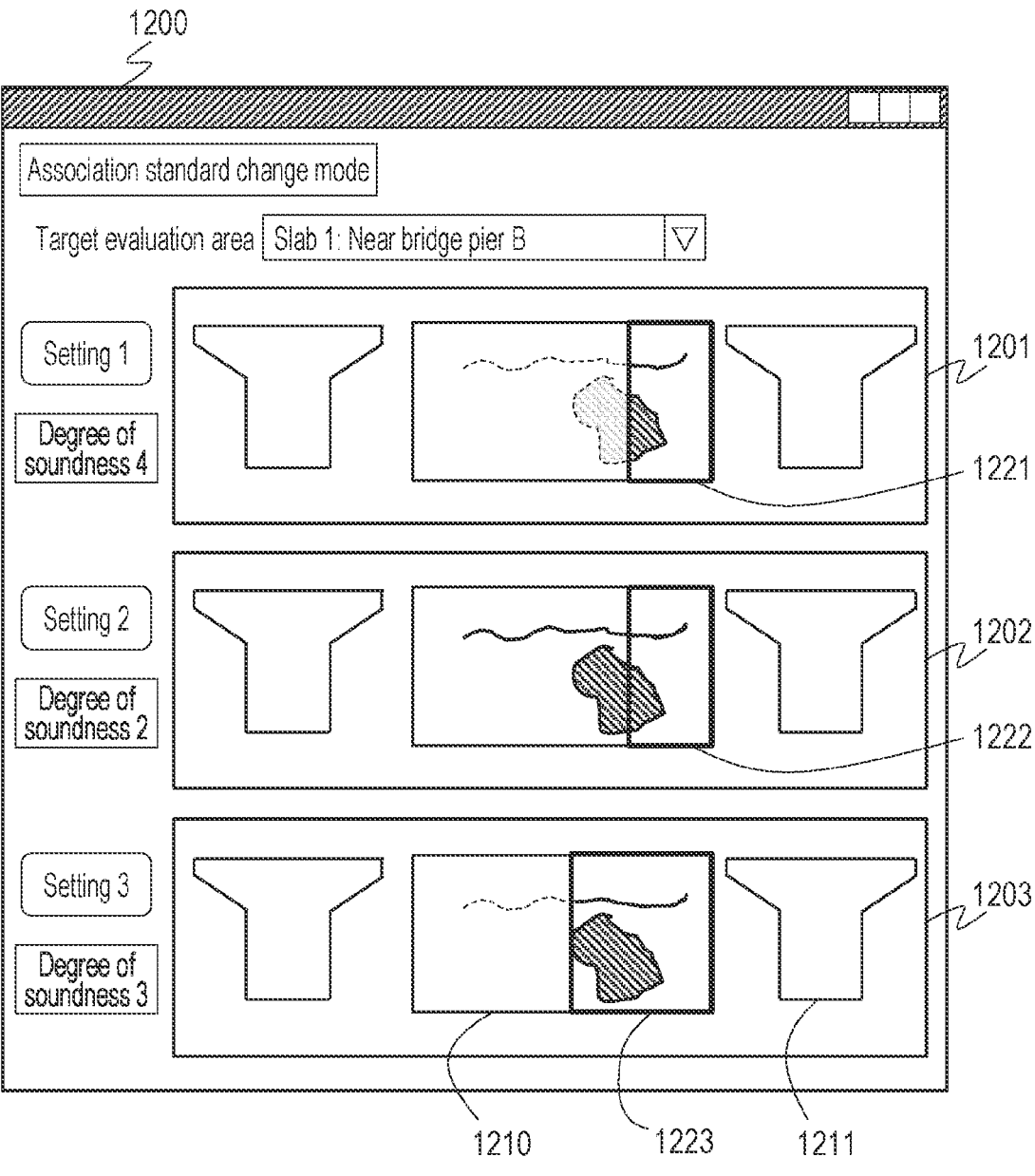
FIG. 12 is a diagram for explaining another example of changing an association standard according to the first embodiment.

With reference to FIG. 12, as another example of the evaluation area, a case where the evaluation area is a part of a slab of a bridge will now be described. In FIG. 12, similarly to FIG. 10, a display window 1200 for changing the association standard is illustrated. In each of image display areas 1201, 1202, and 1203, a wall surface image superimposed on a drawing of a slab 1210 of a bridge and piers 1211 of the bridge, and defective-state information, are displayed. Each of frames 1221, 1222, and 1223 shown on the slab depicts a degree-of-soundness evaluation area. In the example illustrated here, for determining the degree of soundness of the slab, not the whole of the slab but an area of the slab in the neighborhood of a pier is set as the evaluation area.

In FIG. 12, the image display area 1201, 1202 displays the association of a defective state with the evaluation area when the association standard is changed individually for each defective-state type. Specifically, the image display area 1201 displays a state in which only a defective state within the range of the evaluation area is associated with the evaluation area, and the image display area 1202 displays a state in which, for a defective state that exists across the border of the evaluation area, the whole of the defective state is associated with the evaluation area. These defects, as in FIG. 10, are displayed in a highlighted manner so that the user will be able to understand the range of the defective state associated with the evaluation area.

As a modification of the method for setting the association standard for associating the defective state with the evaluation area, the range of the evaluation area may be changed. The evaluation area 1223 in the image display area 1203 is set to be wider than the evaluation area 1221, 1222. As described here, the setting unit 205 may be configured to be able to set the range of evaluating the slab in the neighborhood of the bridge pier arbitrarily on the basis of user instructions.

A modification example of the first embodiment will be described below.

First, in the first embodiment, an embodiment of learning a method for determining the degree of soundness by means of a machine learning algorithm has been described, and, as its example, a decision tree has been described. The machine learning algorithm used in the first embodiment is not limited to a decision tree. Any other method may be used. In particular, an embodiment using a randomized tree, which has a binary-determination tree structure similarly to a decision tree, is a preferred modification example.

When the results of the degree-of-soundness determination for a plurality of evaluation areas and the defective state relevant to said determination are displayed in a highlighted manner as illustrated in FIG. 8, the method of displaying the defective state may be varied depending on the value of the degree of soundness. For example, a predetermined color has been set in advance for each degree of soundness 1 to 5. Then, the defective state relevant to the degree-of-soundness determination, which is highlighted, in each evaluation area may be displayed using the color corresponding to the degree of soundness of the evaluation area. Performing such color display makes it easier to confirm the results of the degree-of-soundness determination of the plurality of evaluation areas and each defective state relevant to the degree-of-soundness determination at the same time. For the same purpose, the degree of highlighting the defective state relevant to the degree-of-soundness determination may be varied depending on the degree of soundness. For example, the defective state relevant to the degree-of-soundness determination of an evaluation area determined to have a degree of soundness 1 is displayed in a more highlighted manner than the defective state relevant to the degree-of-soundness determination of an evaluation area determined to have a degree of soundness 4. This can be done by drawing a thicker line or a thicker-line area contour, or by using a color that is more noticeable, for displaying the defective state relevant to the determination as having the degree of soundness 1.

Furthermore, though it has been described in the above embodiment that the degree of soundness is determined on an evaluation-area-by-evaluation-area basis, in some instances, a representative degree of soundness of a structure as a whole should be viewed. In such a case, among the degrees of soundness of the respective evaluation areas of the structure, a degree of soundness indicative of the most unsound level (a degree of soundness closest to 1) is taken as the representative degree of soundness of the structure as a whole. Therefore, in a state of displaying the representative degree of soundness of the structure as a whole, it is sufficient to perform the displaying of the defective state relevant to the result of the degree-of-soundness determination as described above for the evaluation area for which the representative degree of soundness has been determined. An average value of the degrees of soundness of the plurality of evaluation areas may be adopted as the degree of soundness of the structure as a whole. In this case, it is sufficient to perform the displaying of the defective state relevant to the result of the degree-of-soundness determination for an evaluation area for which a degree of soundness close to the average value, among the degrees of soundness of the respective evaluation areas of the structure, has been determined.

Second Embodiment

In the first embodiment, an embodiment of using a machine-learned determination model for determining the degree of soundness has been described. The method for determining the degree of soundness according to the present embodiment is not limited thereto. Any other method may be used. In the second embodiment, a method of using preset rules as determination criteria for determining the degree of soundness will be described. Since the hardware configuration and functional configuration of the second embodiment are the same as those of the first embodiment, an explanation of them is omitted.

In the second embodiment, rules for determining each degree of soundness have been designed by a human in advance and have been set in advance. The information processing apparatus 100 (specifically, the degree-of-soundness determination unit 202) determines the degree of soundness automatically by using the determination rules. Each one of the determination rules corresponds to the determination criterion according to the first embodiment. Degree-of-soundness determination processing performed by the degree-of-soundness determination unit 202 according to the second embodiment will be described below.

In FIG. 13, an example of determination rules for the degree of soundness 2 and determination rules for the degree of soundness 3, and the result of the degree-of-soundness determination for a certain evaluation area, are illustrated. First, each determination rule is a criterion for performing binary determination on the basis of the defective-state information associated with the evaluation area and the specs-and-conditions information of the structure. For example, a rule R2-1 for determination as the degree of soundness 2 in FIG. 13 is "Does any crack having a crack width of 1.0 mm or greater exist?" According to this rule, the degree of soundness of the evaluation area is determined to be the degree of soundness 2 if any crack having a crack width of 1.0 mm or greater exists in the evaluation area. As described here, the determination result will be the degree of soundness 2 if the defective state in the evaluation area and the specs-and-conditions information that are included in any of the determination rules for the degree of soundness 2 is true. Moreover, in the method for determining the degree of soundness by using the determination rules, the lowest degree of soundness for which the determination rule(s) is true is taken as the result of the degree-of-soundness determination. For example, in FIG. 13, determination results based on the defective-state information of the certain evaluation area and the specs-and-conditions information thereof are shown in a column 1301 under the heading of "determination". In this example, all of the determination rules for the degree of soundness 1 are assumed to be false.

As illustrated in FIG. 13, also with regard to all of the determination rules for the degree of soundness 2, the defective-state information of the evaluation area, and the specs-and-conditions information, are false. By contrast, with regard to the determination rules for the degree of soundness 3, two determination rules are true. Consequently, irrespective of the result of determination according to the determination rules for the degree of soundness 4 and the determination rules for the degree of soundness 5, the degree of soundness of the evaluation area that is the target of evaluation is determined to be the degree of soundness 3.

The degree-of-soundness determination unit 202 determines the degree of soundness as described above, and, in addition, outputs the grounds for the degree-of-soundness determination, similarly to the first embodiment. The grounds for the determination according to the second embodiment is the determination rule(s) (the determination criterion(s)) determined to be true in the degree-of-soundness determination. In the example illustrated in FIG. 13, determination rules R3-1 and R3-3 constitute the grounds for the determination.

The defective-state information analysis unit 203 identifies the defective-state information relevant to the degree-of-soundness determination on the basis of the grounds for the determination outputted by the degree-of-soundness determination unit 202. For example, assume that a crack having a crack width of 0.5 mm or greater and existing in the evaluation area is relevant to the degree-of-soundness determination on the basis of the determination rule R3-1 in the example illustrated in FIG. 13. Position information on the crack having a crack width of 0.5 mm or greater and existing in the evaluation area is acquired from the defective-state information storage unit 206. Similarly, on the basis of the determination rule R3-3, position information on the grid crack (grid pitch: 50 cm) is acquired from the defective-state information storage unit 206. The display information processing unit 204 performs highlighted display of the defective state relevant to the degree-of-soundness determination and performs clipping an image of the range of the defective state as described earlier in the first embodiment by using the position information on these defects.

Moreover, also in the method for determining the degree of soundness by using the determination rules, the degree of importance of the defective-state type(s) relevant to the degree-of-soundness determination may be calculated. In the first embodiment, the degree of importance is calculated on the basis of the information gain obtained in the process of learning the decision tree. However, since no information gain exists in determination rules, it follows that an alternative method is used for calculating the degree of importance. As a method for calculating the degree of importance in the second embodiment, for example, the number of times the determination rule is true may be calculated for each defective-state type. For example, in the example illustrated in FIG. 13, a counter value for "crack" is 2 because the determination rules R3-1 and R3-3, both of which relate to "crack", are true. As a result of this count, the degree of importance of "crack" for the result of the degree-of-soundness determination is 2. This processing is performed for each defective-state type, and the degree of importance for each defective-state type is obtained. By this means, the display information processing unit 204 is able to cause the degree of importance to be displayed for each defective-state type, similarly to the first embodiment. Moreover, the grounds for the determination outputted by the degree-of-soundness determination unit 202 may be displayed, similarly to the first embodiment.

As explained above, also in a case where determination rules are used in the method for determining the degree of soundness, it is possible to display information on the defective state relevant to the degree-of-soundness determination, and the user is able to understand the grounds for the degree-of-soundness determination performed by the information processing apparatus 100.

Third Embodiment

In the second embodiment, an embodiment of determining the degree of soundness on the basis of human-made determination rules has been described. The method of generating determination rules in a human-made manner has advantages that it is easier to understand determination criteria for determining the degree of soundness and it is possible to control the determination criteria on the basis of human knowledge. On the other hand, there is a problem that, in a case where preparation of complex determination criteria is demanded for the purpose of determining the degree of soundness accurately, it is difficult for a human to design all of the determination criteria manually. For example, in a case where determination criteria including not only information about the presence or absence of a defective state such as a crack and the size thereof but also information about the number of years that have elapsed since the start of service of the structure and the geographical position thereof and the like are set, the number of combination of conditions will be huge, making it difficult for a human to decide the determination criteria while taking all of the conditions into consideration. Therefore, it is sometimes better to use machine learning for statistically learning the determination criteria for determining the degree of soundness. Learning the determination criteria by means of the decision tree having been described in the first embodiment is one of solutions to it.

In the present embodiment, learning the determination rules by means of frequent pattern mining will be described. Learning the determination rules by means of frequent pattern mining is one of approaches for learning human-understandable binary determination criteria. This is one of embodiments for acquiring the determination criteria by learning, and is a modification of the first embodiment. Since the hardware configuration and functional configuration of the third embodiment are the same as those of the first embodiment, an explanation of them is omitted.

In frequent pattern mining, an item that appears frequently under a predetermined condition, or a combination of items, is extracted. With reference to FIG. 14, an embodiment of applying this technique to learning the determination rules for the degree-of-soundness determination will be described below. FIG. 14 is a diagram illustrating an overall picture of determination-rule learning based on frequent pattern mining.

First, for the purpose of explaining determination-rule learning according to the present embodiment in the context of frequent pattern mining, an item and an itemset will now be explained. In the present embodiment, a certain stand-alone determination criterion for determining the degree of soundness is defined to be an item. A table 1401 in FIG. 14 shows an example of item definition. For example, an item I1 is the following determination criterion: In the evaluation area, "does any crack exist?" As described here, in the present embodiment, a stand-alone determination criterion is defined to be certain one item. An item of a determination criterion that includes a threshold value for the attribute information such as the size of a defective state may be generated. For example, an item I2 illustrated in FIG. 14 is the following determination criterion that includes the defective-state information and a threshold value for the attribute information: "Does any crack having a crack width of 0.5 mm or greater exist?" Similarly, a determination criterion regarding the specs-and-conditions information is also defined to be an item. For example, the following determination criterion is defined to be an item IM: "Is the number of years that have elapsed since the start of service fifty or longer?" The entire set of items will be hereinafter expressed as $I_{all}=\{I1, I2, \ldots, IM\}$. A subset in $I_{all}$ will be hereinafter referred to as "itemset". The itemset is a single item alone or a combination of items. The object of frequent pattern mining is to extract an itemset that can be used for determining the degree of soundness from the entire set of items $I_{all}$.

In the above item definition, an example of performing item definition by using a threshold value for the size of the defective state has been described. However, the defining into an item may be performed in accordance with discretized numerical values. Specifically, for example, through discretization of crack-width classification, items such as "Does any crack having a crack width within a range from 0.2 mm to 0.5 mm exist?", "Does any crack having a crack width within a range from 0.5 mm to 1.0 mm exist?" may be defined.

Next, in order to perform frequent pattern mining, transaction data is generated from learning data D. For the learning data D, similarly to the first embodiment, $D=\{D_i\}$ holds, where $D_i$ denotes data about certain one evaluation area of a certain structure. In addition, $D_i$ is defined by the following equation.

$$D_i=(X_i,y_i) \hspace{2cm} \text{Formula 3}$$

$X_i$ is defective-state information associated with a certain evaluation area, and specs-and-conditions information of a certain structure. $y_i$ is correct-answer data of the degree of soundness determined by a human on the basis of $X_i$, and, in the present embodiment, denotes the degree of soundness 1 to 5.

One transaction $T_i$ is generated from one piece of learning data $D_i$ described above. The generated transaction $T_i$ is, for example, $T_i=\{I1, I2, I9, I20: y_i\}$. In this case, it means that $X_i$ (the defective-state information of the evaluation area and the specs-and-conditions information thereof) of the data $D_i$ meets the conditions of I1, I2, I9, and I20 in the item definition. As another specific example, if $X_i$ includes any crack having a crack width of 0.5 mm or greater, the conditions of the items I1 and I2 are met. Assuming that $X_i$ fails to meet the conditions of the other items, $T_i=\{I1, I2: y_i\}$.

As described above, the transaction data $T_i$ is generated for each $D_i$ of the learning data D. When an itemset included in the transaction data $T_i$ is denoted as $I_i$, the transaction data $T_i$ is expressed as follows: $T_i=\{I_i; y_i\}$. In addition, a data set of all pieces of the transaction data is denoted as T, where $T=\{T_i\}$.

In the description below, frequent pattern mining is performed using this transaction data set T. In the frequent pattern mining, an itemset that appears frequently in the transaction data set T is extracted. This is taken as a determination rule. Processing for frequent pattern extraction is performed for each degree of soundness, and determination rules for each degree of soundness are learned. Processing for frequent pattern extraction will be described below while taking the learning of determination rules for the degree of soundness 3 as an example.

In the present embodiment, it is assumed that Apriori (NPL 1) is used for frequent pattern extraction. In Apriori, a degree as to how frequently a certain itemset appears in a transaction data set is referred to as "support" (Support, a degree of support). The support can be expressed by the following formula.

$$\text{Support } (I, T) = \frac{\sigma_T(I)}{N} \qquad \text{Formula 4}$$

N denotes the number of pieces of data in the transaction data set T. $\sigma_T(I)$ denotes the number of pieces of the transaction data set $T_i$ including an itemset I. In Apriori, a threshold value called as "minimum support" has been given in advance, and an itemset that indicates a support that is not less than the minimum support is extracted as a frequent pattern. Though a detailed explanation of Apriori is not given because it is a known algorithm, it is possible to discover an itemset that indicates a support that is not less than the minimum support efficiently by specifying the minimum support in advance at the time of executing a search for an itemset that appears frequently.

In the determination-rule learning for the degree of soundness 3, the focus is on transaction data of the degree of soundness 3 only. When a transaction data set comprised of transaction data of the degree of soundness 3 only, that is, transaction data of $y_i=3$ only, is denoted as $T^{(3)}$, the support can be expressed by the following formula.

$$\text{Support } (I, T^{(3)}) = \frac{\sigma_T(I)}{N^{(3)}} \qquad \text{Formula 5}$$

$N^{(3)}$ denotes the number of pieces of data in $T^{(3)}$. By executing Apriori using this support, it is possible to extract a set of eventsets that appear frequently in the transaction data set of the degree of soundness 3. The set of eventsets is expressed by $I^{(3)}=\{Ia, Ib, \ldots, In\}$, where Ia, Ib, . . . , denote eventsets such as Ia={I1, I4, I10}, Ib={I8}.

Next, an eventset that is unique to the transaction of the degree of soundness 3 is selected out of $I^{(3)}$. Though the eventset set $I^{(3)}$ is a set of eventsets that appear frequently in the learning data of the degree of soundness 3, there is a possibility that an eventset that appears frequently in the learning data of any other degree of soundness might also be included in it. That is, there is a possibility that an item that tends to appear always frequently, or a combination of items having this tendency, irrespective of the degree of soundness, might be included in it. Therefore, processing for selecting an eventset that is unique to a learning data set of the degree of soundness 3 by using learning data sets of the degrees of soundness other than the degree of soundness 3 is performed. Specifically, a ratio of the support (the frequency of appearance) for each eventset of $I^{(3)}$ in the transaction data set $T^{(3)}$ to the support in the transaction data sets other than that of the degree of soundness 3 is calculated, and an eventset whose calculated value is large is taken as the eventset that is unique to the degree of soundness 3. This support ratio is called as Growth Rate and can be expressed by the following formula.

$$\text{Growth Rate } (I, T^{(3)}, T^{(not\ 3)}) = \frac{\text{Support } (I, T^{(3)})}{\text{Support } (I, T^{(not\ 3)})} = \frac{\frac{\sigma_T(I)}{N^{(3)}}}{\frac{\sigma_T(I)}{N^{(not\ 3)}}} \qquad \text{Formula 6}$$

In this formula, the transaction data set generated from the learning data set of the degree of soundness other than the degree of soundness 3 is denoted as $T^{(not\ 3)}$. I denotes the target eventset for which Growth Rate is calculated and which is included in $I^{(3)}$. In the description below, Growth Rate is abbreviated as GR. Patterns that appear biasedly in either one data set like this are called as Emerging Patterns (NPL 2).

In the above example, the greater the GR is, the more unique to the degree of soundness 3 the itemset is. Therefore, it is possible to generate a set of itemsets that are unique to the degree of soundness 3 by selecting itemsets having the GR not less than a certain threshold value from the itemset set $I^{(3)}$. This itemset set $R^{(3)}=\{R3-1, R3-2, R-3N\}$ unique to the degree of soundness 3 can be used as the determination rules for determining the degree of soundness 3. Specifically, as shown in a table 1402 in FIG. 14, for example, R3-1={I2}, and the item I2 "Does any crack having a crack width of 0.5 mm or greater exist?" is learned as one of the determination rules. Moreover, as shown by R3-2={I5, I10}, a determination rule(s) that is a combination of a plurality of items is also learned. Instead of using threshold processing for selecting event patterns on the basis of the GR, event patterns having the top n values of the GR may be selected.

It is possible to learn the determination rules for the degree of soundness 3 by means of frequent pattern mining as described above. Similar processing is performed for each degree of soundness, and the determination rules for the degrees of soundness 1 to 5 are learned. Processing of determining the degree of soundness of the target evaluation area by using the learned determination rules, and subsequent processing of displaying information on the defective state relevant to the degree-of-soundness determination, can be performed in the same manner as the second embodiment. That is, a determination rule(s) for which the defective-state information and the specs-and-conditions information of an input are true is found, and this determination rule(s) is taken as the grounds for the determination. Then, display such as highlighted display of the defective state is performed on the basis of the defective-state information included in the grounds for the determination.

The degree of soundness may be determined as the degree of soundness 5 (the soundest) if not determined as the degree of soundness 1 to 4, without learning the determination rules for the degree of soundness 5.

The GR may be used for calculating the degree of importance of the defective-state type. In this case, the GR of each of the determination rules, for example, R3-1, R3-2, . . . , is stored together with the determination rule at the time of learning. The greater the GR is, the greater the degree of uniqueness of the eventset to this degree of soundness is. Therefore, it is possible to calculate the degree of importance of each defective-state type for the result of the degree-of-soundness determination by utilizing the GR in the same manner as the information gain of each node in the decision tree according to the first embodiment.

Furthermore, the determination rules having been learned may be visually presented to the user so that the user can adjust the determination rules. In this case, first, the determination rules having been learned using the above method are displayed in such a manner that the user can understand the content of the items. Specifically, items of the itemsets in the table 1402 illustrated in FIG. 14 are displayed as the specific content of items. For example, it is displayed that the content of the determination rule R3-1 is the following determination criterion "Does any crack having a crack width of 0.5 mm or greater exist?" This enables the user to confirm what kind of determination rules have been learned using frequent pattern mining. On the basis of this display, the user can make determination-rule adjustments. Specifically, the user removes a determination rule(s) which can be judged to be inappropriate for being adopted as the determination rule, and/or adds a determination rule(s) which should be added though not having been learned. Consequently, it is possible to generate determination rules that are based on human knowledge and experience added to the original machine-acquired determination rules.

In general, in order to prepare learning data, it takes time for data accumulation. Therefore, in operation in which the degree of soundness is determined by an information processing apparatus, first, at the initial phase of the operation, as explained earlier in the second embodiment, the degree of soundness is determined on the basis of human-made determination rules. Data (the defective-state information of the evaluation area and the specs-and-conditions information thereof) inputted at this time may be stored, and, upon accumulation of a predetermined amount of data, determination rules may be learned using the accumulated data as learning data. Labels of the degrees of soundness 1 to 5 that are learned are human-confirmed data of the results of degree-of-soundness determination performed by the information processing apparatus or human-correction results of the results of degree-of-soundness determination performed by the information processing apparatus. By this means, even from the initial phase in which no learning data exists, it is possible to perform the operation of automatic degree-of-soundness determination by the information processing apparatus. The learning of the determination rules consequent upon data accumulation may be performed more than once step by step, not just once, in accordance with the progress of accumulation of the learning data. This embodiment of accumulating the learning data and then performing learning at the timing of acquiring a predetermined amount of the learning data can be implemented also in the learning of a degree-of-soundness determination method using a machine-learning algorithm according to the first embodiment.

Two-step determination-rule learning that includes frequent pattern extraction using Apriori and selection of itemsets unique to each degree of soundness has been described above. However, the determination-rule learning method according to the present embodiment is not limited thereto. That is, any other method may be used as long as it is a method of extracting particular itemsets by using learning data. For example, the method for frequent pattern extraction is not limited to Apriori. A method called as FP-Growth is also known well. Alternatively, the frequent pattern extraction may be performed using any other algorithm that achieves high calculation efficiency.

It has been described above that the learned determination rules are used in the same manner as the second embodiment. That is, it has been described that, in a case where input data satisfies any of the determination rules for a certain degree of soundness, this degree of soundness is obtained as the result of the degree-of-soundness determination. However, the determination rules having been learned by performing the above learning have different degrees of reliability respectively, as indicated by their GR. Therefore, a score may be calculated from the determination rules by using the support and the GR, and the degree of soundness may be determined on the basis of the score. As explained above, the determination rules are itemsets that appear in the transaction data set of a particular degree of soundness, and are called as Emerging Patterns. An ensemble classification method using Emerging Patterns is disclosed in NPL 3. An embodiment of determining the degree of soundness from the learned determination rules by using this method will be described below. To implement this method, the support and GR of each determination rule are stored in advance at the time of learning the determination rule.

First, based on NPL 3, a determination score SH of a certain degree of soundness H can be expressed as follows.

$$S_H = \sum_{I \subseteq IN, I \subseteq I^{(H)}} \frac{GrowthRate(I)}{GrowthRate(I) + 1} * \text{Support } (I) \qquad \text{Formula 7}$$

In this formula, IN denotes items included in the defective-state information of the evaluation area that is the target of the degree-of-soundness determination and the specs-and-conditions information thereof, and $I^{(H)}$ denotes determination rules for the degree of soundness H. That is, the total sum of values calculated on the basis of the GT and the support, in the determination rules for which the input data of the defective-state information of the evaluation area and the specs-and-conditions information thereof is true, is the score SH of determining the degree of soundness H. According to this formula, the score SH obtained will become higher as the values indicated by the GR and support of the determination rule determined to be true become greater. The score SH is calculated for each degree of soundness, and the degree of soundness for which the highest score SH is outputted is taken as the degree of soundness H of the evaluation area.

$$H = \underset{H}{\text{argmax}} S_H \qquad \text{Formula 8}$$

In the third embodiment, a method for learning determination rules for the degree of soundness by means of frequent pattern mining has been described above. Learning determination rules by means of frequent pattern mining makes it possible to generate determination rules that are more complex and achieve higher determination performance than human-set determination rules. Moreover, since the results of learning are determination rules with the use of which binary determination can be performed, it is easier for a human to understand the results of learning, and it is possible to adjust the determination rules. Furthermore, by using the learned determination rules for determining the degree of soundness in the same manner as in the second embodiment, it is possible to display information on the defective state relevant to the degree-of-soundness determination and, therefore, it is possible to display the grounds for the degree-of-soundness determination in an easy-to-understand manner.

Fourth Embodiment

In each of the foregoing embodiments, with regard to the setting of the association standard for associating the defective state with the evaluation area, an embodiment of performing the setting on a defective-state-type-by-defective-state-type basis has been described. The method of performing the setting of the association standard is not limited to such a defective-state-type-by-defective-state-type method; it may be configured such that the setting can be performed for each individual defect. In the fourth embodiment, an embodiment of performing, for each individual defect, the setting of the association standard for associating the defective state with the evaluation area will be described. Since the hardware configuration and functional configuration of the fourth embodiment are the same as those of the first embodiment, an explanation of them is omitted.

Figure 15:
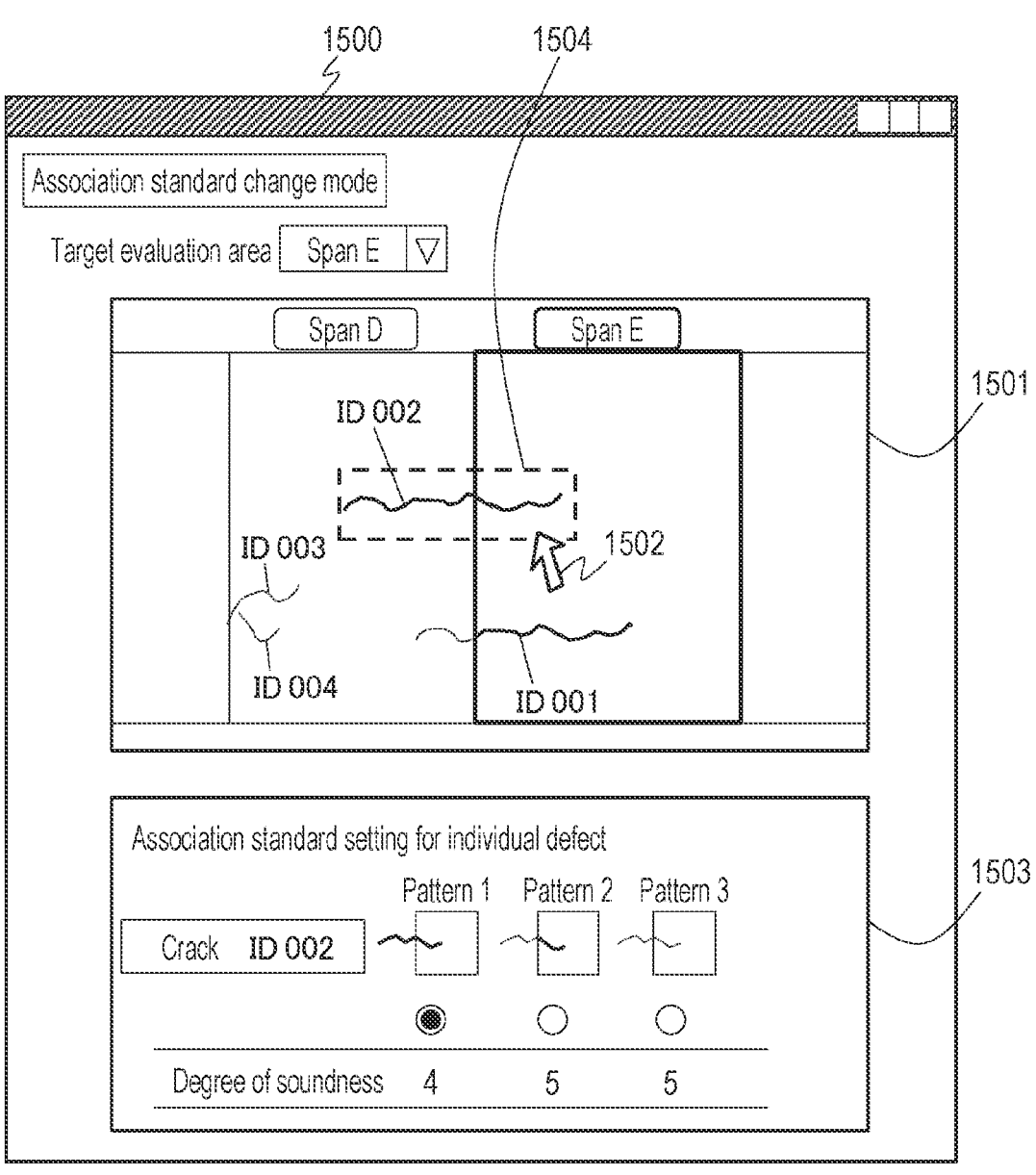
FIG. 15 is a diagram for explaining changing an association standard according to a fourth embodiment.

FIG. 15 illustrates a display window 1500 which the setting unit 205 causes the display unit 105 to display for the purpose of performing, for each individual defect, the setting of the association standard for associating the defective state with the evaluation area. In FIG. 15, a degree-of-soundness evaluation area is set for each span of a tunnel. FIG. 15 illustrates a state in which the setting of the association standard for associating the defective state with the evaluation area is performed for a span E. In an image information display portion 1501, four cracks having crack IDs 001 to 004 are displayed. The cracks having crack IDs 003 and 004 are not associated with the span E and are shown using dotted lines because they are located at positions irrelevant to the span E.

The user selects a defect for which a setting adjustment is to be made for the purpose of performing the setting of the association standard individually. For example, by operating a mouse cursor 1502, the user selects a defect for which the user wants to make a setting adjustment. In FIG. 15, a state in which the crack having the crack ID 002 is selected is illustrated. A dotted-line frame 1504 indicates that the crack having the crack ID 002 is focused. When the crack having the crack ID 002 is selected, information for selecting an association standard for associating the crack having the crack ID 002 to the span E is displayed in a standard setting area 1503.

In FIG. 15, three types of association standard, association patterns 1 to 3, are available for a defective state that exists across the border of the evaluation area, as the association standard for associating the defective state with the evaluation area, similarly to the first embodiment. The association pattern 1 is a pattern according to which, for a defective state that exists across the border of the evaluation area, the whole of the defective state is used for determining the degree of soundness. The association pattern 2 is a pattern according to which, for a defective state that exists across the border of the evaluation area, only a part of the defective state within the range of the evaluation area is used for determining the degree of soundness. The association pattern 3 is a pattern according to which a defective state that exists across the border of the evaluation area is excluded from those used for determining the degree of soundness of the evaluation area".

FIG. 15 illustrates a state in which the association pattern 1 has been set by the user as the association standard of the crack having the crack ID 002. Because of this setting, in the image information display portion 1501, the whole of the crack having the crack ID 002 is displayed using a thick line and is associated with the span E. On the other hand, it is assumed that the association standard corresponding to the association pattern 2 has been set for the crack having the crack ID 001, though not illustrated. Because of this setting, the crack having the crack ID 001 is displayed partially using a thick line for the purpose of showing that its portion within the range of the span E is associated with the span E and is displayed partially using a dotted line for the purpose of showing that its portion outside the range of the span E is not associated with the span E. As described here, in the fourth embodiment, it is possible to set different association standards respectively for the crack having the crack ID 001 and the crack having the crack ID 002, which are of the same defective-state type.

On the screen on which the setting of the association standard is performed individually for each defect, how the degree of soundness will change depending on the association setting may be displayed. In the standard setting area 1503 illustrated in FIG. 15, the degree of soundness of the span E is determined for cases where the respective association patterns are set for the crack having the crack ID 002, and the result of the determination is displayed. This enables the user to set the association standard for associating the defective state with the evaluation area while confirming a change in the degree of soundness that will result from changing the association standard of the individual defect.

As explained above, in the fourth embodiment, an embodiment of performing, for each individual defect, the setting of the association standard for associating the defective state with the evaluation area has been described. This makes it possible to set the association of the defective state with the evaluation area in detail. Accordingly, the user is able to make a detailed adjustment of the result of the degree-of-soundness determination.

Fifth Embodiment

In each of the foregoing embodiments, an embodiment of determining the degree of soundness of the evaluation area while associating a defective state that is located with the evaluation area or exists across the border of the evaluation area with the evaluation area has been described. The association of the defective state with the evaluation area may be performed for a defective state that is not in a positional relationship of directly overlapping with the evaluation area as in the present embodiment. In the fifth embodiment, an embodiment of associating a defective state that is not directly related to the evaluation area as the defective state to be used for determining the degree of soundness of the evaluation area will be described. That is, in the fifth embodiment, an association rule for associating a defective state that exists in a relevant area, which is different from the evaluation area but is relevant in determining the degree of soundness, as the defective state to be used for determining the degree of soundness of the evaluation area, is set. Since the hardware configuration and functional configuration of the fifth embodiment are the same as those of the first embodiment, an explanation of them is omitted.

Figure 16:
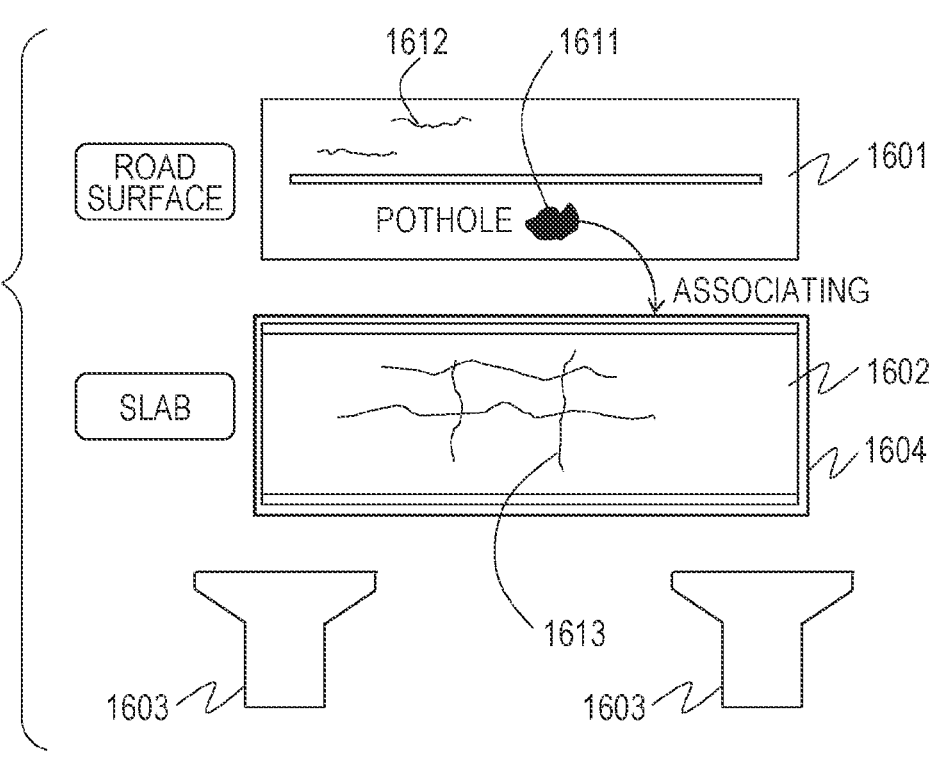
FIG. 16 is a diagram for explaining changing an association standard according to a fifth embodiment.

FIG. 16 illustrates a drawing and an image of a road bridge that is the target of determining the degree is soundness. In FIG. 16, a slab 1602 between piers 1603 of the road bridge is illustrated. The slab 1602 is a portion looked up from the ground. A drawing and an image of a road surface 1601 of the bridge are also shown in FIG. 16. In order to determine the degree of soundness of the slab 1602, processing for associating a defective state to be used for determining the degree of soundness of the slab 1602 therewith is performed herein. A frame 1604 that encloses the slab 1602 indicates that the whole of the slab 1602 is the evaluation area that is the target of processing.

In the example illustrated in FIG. 16, an embodiment in which not only a defective state of the slab 1602 but also a defective state of the road surface 1601, which is on the back of the slab, are included in the defective state to be used for determining the degree of soundness of the slab 1602 is disclosed. Specifically, a pothole 1611 is associated with the evaluation area 1604 and is used for determining the degree of soundness of the evaluation area 1604 of the slab 1602. For this purpose, the following association standard is set for associating a defective state with the evaluation area 1604 in FIG. 16: "A pothole that exists in the road surface on the back of the slab is also associated with the evaluation area". At a portion such as a pothole where the road surface is significantly damaged, the slab will also be affected by water such as rainwater. Therefore, the degree of soundness of the slab should preferably be determined while including this influence, too. A pothole is a round hole or a depression formed as a result of the surface layer of an asphalt road coming off. As described here, the degree of soundness may be determined while also associating a defective state that is not directly included in the evaluation area with the evaluation area. Changing the setting of the association standard can be performed on a defective-state-type-by-defective-state-type basis in the same manner as in the first embodiment described earlier or on an individual-defect-by-individual-defect basis in the same manner as in the fourth embodiment described earlier. For example, in FIG. 16, a crack 1612 in the road surface 1601 is not associated with the evaluation area 1604 of the slab 1602 and is not used for determining the degree of soundness of the evaluation area 1604. The user is able to set association/non-association by operating the operation unit 105 as needed.

With regard to the target area for a case of associating a defective state that is not directly related to the evaluation area with the evaluation area, an area that is related to the evaluation area either structurally or in terms of inspection has been set in advance, as in a relation between the slab and the road surface in FIG. 16. In addition, the association standard as to whether or not to associate a defective state within this related area with the evaluation area is configured to be adjustable. Alternatively, as another method, it may be configured such that a setting of associating an arbitrary defective state that is located at an arbitrary position with the evaluation area individually can be made.

With the method described in the fifth embodiment above, it is possible to associate a defective state that is not directly related to the evaluation area as the defective state to be used for determining the degree of soundness. By this means, it is possible to determine the degree of soundness while also taking into consideration a defective state that has an influence on the degree of soundness of the evaluation area though not included in the evaluation area. Moreover, it is possible to adjust the result of the degree-of-soundness determination by adjusting this association standard.

Sixth Embodiment

In the foregoing embodiments, it has been described that various kinds of processing are performed by the information processing apparatus 100 illustrated in FIG. 1. In the sixth embodiment, a processing configuration for providing services to users by a system that includes a server and clients will be described.

Figure 17A:
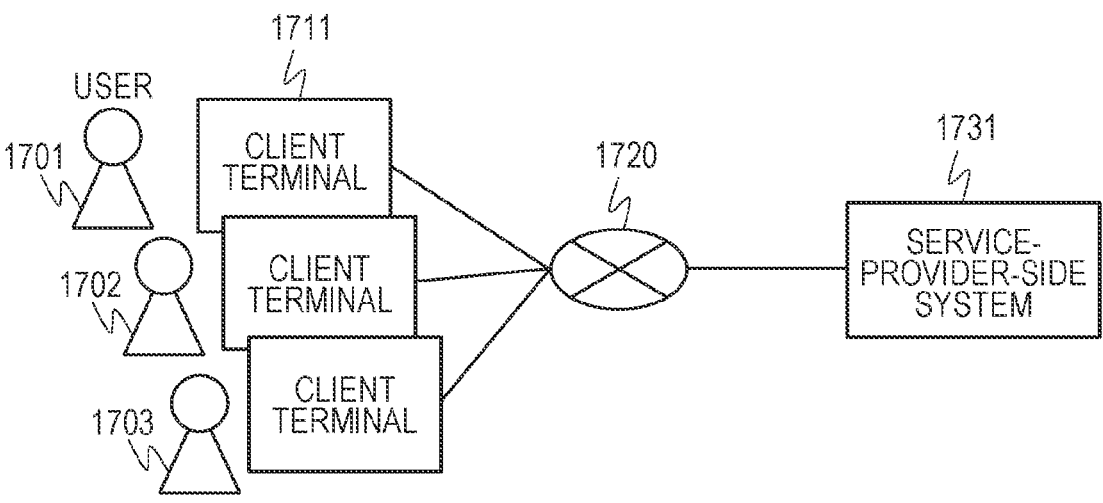
FIG. 17A is a diagram for explaining a configuration of an information processing apparatus according to a sixth embodiment.

FIG. 17A is a configuration diagram of the information processing apparatus 100 (an information processing system) according to the present embodiment. This diagram illustrates an embodiment of processing in a server-client configuration. In FIG. 17A, each of client terminals 1711 and a service-provider-side system 1731 is an information processing apparatus that has a hardware configuration similar to that of the information processing apparatus 100 illustrated in FIG. 1. In FIG. 17A, the client terminals 1701 to 1703 operated by users 1701 to 1703 are connected to the service-provider-side system 1731 via the Internet 1720.

In FIG. 17A, processing regarding the display unit 105 and the operation unit 106 only is performed at the client terminals, and other processing (for example, processing of the degree-of-soundness determination unit 202) is performed at the service-provider-side system 1731. With this configuration, it is possible to perform light-load processing only at the client terminals and perform processing that involves a large amount of computation such as degree-of-soundness determination processing at the service-provider-side system 1731 that offers high performance. This makes it possible for the users 1701 to 1703 to enjoy the services just by preparing low-cost less-powerful client terminals.

Figure 17B:
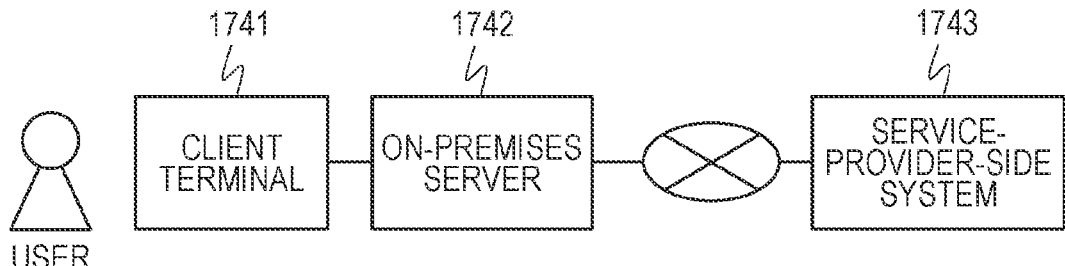
FIG. 17B is a diagram for explaining a configuration of an information processing apparatus according to the sixth embodiment.

Processing distribution is not limited to the example illustrated in FIG. 17A. Other configurations can be adopted. For example, as a processing configuration different from that of FIG. 17A, FIG. 17B illustrates a configuration that includes an on-premises server 1742. In FIG. 17B, processing according to the present embodiment is performed in a distributed manner by a client terminal 1741, the on-premises server 1742, and a service-provider-side system 1743. For example, the service-provider-side system 1743 performs the learning of a method for determining the degree of soundness to generate a degree-of-soundness determination model that is the result of the learning, or degree-of-soundness determination rules, and transmits the model or the rules to the on-premises server 1742. The on-premises server performs processing such as degree-of-soundness determination processing, and the client terminal 1741 displays the result of the degree-of-soundness determination. By this means, even in a case where the inspection image and the result of the degree-of-soundness determination are confidential, since the degree-of-soundness determination processing is performed at the on-premises server 1742 of the enterprise internally, it is possible to construct a safe system from the viewpoint of information security. On the other hand, it is possible to receive latest services such as the providing of a latest degree-of-soundness determination model from the service-provider-side system 1743.

Moreover, with the configuration according to the present embodiment, it is possible to provide services suitable for each user individually. For example, the method for determining the degree of soundness could differ from user to user. For example, expected users in the present embodiment include inspection service providers, structurer administrators, and infrastructure administration departments of local government authorities, etc. These users sometimes have their own inspection standards. Moreover, the method for determining the degree of soundness and the criteria for the determination differ from administration target structure to administration target structure. Therefore, by providing a method for determining the degree of soundness (a degree-of-soundness determination model, determination rules)

suitable for the user's needs and situation, it is possible to perform degree-of-soundness determination suitable for each user.

Similarly, an association standard suitable for each user may be provided for association with the evaluation area. For example, the association standard that was set by the user previously is stored together with user information at the service-provider-side system 1731. Then, when this user performs a new degree-of-soundness determination, the association standard that was set by the user previously is provided as the default setting of the association standard.

Furthermore, with regard to the association standard, the association standard set by the user may be learned. For example, as described earlier in the fourth embodiment, the association standard can be set for each individual defect. In the learning of the association standard, this tendency of the setting by the user is learned. Specifically, the learning is performing using an arbitrary machine learning algorithm while taking the size of a defective state, the position of a defective state with respect to the evaluation area, the degree of overlapping of a defective state that exists across the border of the evaluation area with the evaluation area, and the like as input variables and taking association/non-association with the evaluation area as teacher labels. The associating of the defective state with the evaluation area is performed using a model trained as a result of this processing.

As described here, services customized for the tendency of the degree-of-soundness determination of each user may be provided.

Other Embodiments

The present invention may be embodied by supplying, to a system or an apparatus via a network or in the form of a storage medium, a program that realizes one or more functions of the embodiments described above, and by causing one or more processors in the system or the apparatus to read out and run the program. The present invention may be embodied by means of circuitry that realizes the one or more functions (for example, ASIC).

With the present invention, it is possible to provide information on a defective state relevant to the determination of the degree of soundness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions and storing a trained machine-learning model; and
one or more processors executing the instructions to:
acquire an image that includes a structure and store the image in the one or more memories;
receive at least one user input via an input device;
set, based on the at least one user input, at least one of a first condition or a second condition, the first condition being a condition of using a first portion of a damage that exists across a border of a particular area in the image for a determination and not using a second portion of the damage for the determination, the first portion being included in the particular area, the second portion being not included in the particular area, and the second condition being a condition of using both the first portion and the second portion of the damage for the determination;
in response to receiving the at least one user input, in a case where the at least one user input sets the first condition,
generate a first modified image based on the image, wherein generating the first modified image includes highlighting the first portion in the image without highlighting the second portion in the image,
determine, using the trained machine-learning model, how much the structure is damaged using the first portion and without using the second portion, and
generate a first display, wherein the first display includes the first modified image, and wherein the first display includes an indicator of how much the structure is damaged as determined using the first portion and without using the second portion; and
in response to receiving the at least one user input, in a case where the at least one user input sets the second condition,
generate a second modified image based on the image, wherein generating the second modified image includes highlighting the first portion and highlighting the second portion in the image,
determine, using the trained machine-learning model, how much the structure is damaged using the first portion and using the second portion, and
generate a second display, wherein the second display includes the second modified image, and wherein the second display includes an indicator of how much the structure is damaged as determined using the first portion and using the second portion.

2. The information processing apparatus according to claim 1, wherein the instructions further cause the one or more processors to identify, based on the image, the damage that the structure has and that exists across the border of the particular area in the image.

3. The information processing apparatus according to claim 1, wherein the instructions further cause the one or more processors to perform control to simultaneously display the first display and the second display on a display device.

4. The information processing apparatus according to claim 3, wherein the instructions further cause the one or more processors to perform control to alternate between displaying the first display on a display device and displaying the second display on the display device.

5. The information processing apparatus according to claim 1, wherein the instructions further cause the one or more processors to identify the damage by inputting the image into a first trained model.

6. The information processing apparatus according to claim 1, wherein the instructions further cause the one or more processors to determine, by inputting a portion identified based on which of the first condition and the second condition has been set into a second trained model, how much the structure is damaged.

7. The information processing apparatus according to claim 1,
wherein the structure includes a plurality of damages inclusive of the damage that exists across the border of the particular area in the image, and
wherein the instructions further cause the one or more processors to acquire information for identifying the damage used for the determination among the plurality of damages.

8. The information processing apparatus according to claim 1, wherein the structure includes a plurality of damages inclusive of a damage different from the damage that exists across the border of the particular area, wherein the instructions further cause the one or more processors to set, based on the at least one user input, at least one of the first condition, the second condition, and a third condition, the third condition being a condition of not using the damage that exists across the border of the particular area for the determination; and wherein the instructions further cause the one or more processors to determine how much the structure is damaged without using the damage that exists across the border of the particular area for the determination among the plurality of damages in a case where the third condition is set.

9. The information processing apparatus according to claim 1, wherein the structure is any of a tunnel, a bridge, a dam, and a building.

10. The information processing apparatus according to claim 1, wherein the damage is a crack.

11. An information processing method comprising:

acquiring an image that includes a structure;

receiving at least one user input via an input device;

setting, based on the at least one user input, at least one of a first condition or a second condition, the first condition being a condition of using a first portion of a damage that exists across a border of a particular area in the image for a determination and not using a second portion of the damage for the determination, the first portion being included in the particular area, the second portion being not included in the particular area, and the second condition being a condition of using both the first portion and the second portion of the damage for the determination;

in response to receiving the at least one user input, in a case where the at least one user input sets the first condition, generating a first modified image based on the image, wherein generating the first modified image includes highlighting the first portion in the image without highlighting the second portion in the image, determining, using a trained machine-learning model, how much the structure is damaged using the first portion and without using the second portion, and generating a first display, wherein the first display includes the first modified image, and wherein the first display includes an indicator of how much the structure is damaged as determined using the first portion and without using the second portion; and in response to receiving the at least one user input, in a case where the at least one user input sets the second condition, generating a second modified image based on the image, wherein generating the second modified image includes highlighting the first portion and highlighting the second portion in the image, determining, using the trained machine-learning model, how much the structure is damaged using the first portion and using the second portion, and generating a second display, wherein the second display includes the second modified image, and wherein the second display includes an indicator of how much the structure is damaged as determined using the first portion and using the second portion.

12. A non-transitory storage medium that stores a program for causing a computer to execute an information processing method, the information processing method comprising:

acquiring an image that includes a structure;

receiving at least one user input via an input device;

setting, based on the at least one user input, at least one of a first condition or a second condition, the first condition being a condition of using a first portion of a damage that exists across a border of a particular area in the image for a determination and not using a second portion of the damage for the determination, the first portion being included in the particular area, the second portion being not included in the particular area, and the second condition being a condition of using both the first portion and the second portion of the damage for the determination;

in response to receiving the at least one user input, in a case where the at least one user input sets the first condition, generating a first modified image based on the image, wherein generating the first modified image includes highlighting the first portion in the image without highlighting the second portion in the image, determining, using a trained machine-learning model, how much the structure is damaged using the first portion and without using the second portion, and generating a first display, wherein the first display includes the first modified image, and wherein the first display includes an indicator of how much the structure is damaged as determined using the first portion and without using the second portion; and in response to receiving the at least one user input, in a case where the at least one user input sets the second condition, generating a second modified image based on the image, wherein generating the second modified image includes highlighting the first portion and highlighting the second portion in the image, determining, using the trained machine-learning model, how much the structure is damaged using the first portion and using the second portion, and generating a second display, wherein the second display includes the second modified image, and wherein the second display includes an indicator of how much the structure is damaged as determined using the first portion and using the second portion.

* * * * *